(12) United States Patent
Percec

(10) Patent No.: US 8,450,427 B2
(45) Date of Patent: May 28, 2013

(54) LIVING RADICAL POLYMERIZATION OF ACTIVATED AND NONACTIVATED MONOMERS CONTAINING ELECTRON-WITHDRAWING SIDE GROUPS

(75) Inventor: Virgil Percec, Philadelphia, PA (US)

(73) Assignee: The Trustees Of The University Of Pennsylvania, Philadelphia, PA (US)

( * ) Notice: Subject to any disclaimer, the term of this patent is extended or adjusted under 35 U.S.C. 154(b) by 488 days.

(21) Appl. No.: 12/376,315

(22) PCT Filed: Aug. 3, 2007

(86) PCT No.: PCT/US2007/017396
§ 371 (c)(1),
(2), (4) Date: Aug. 11, 2010

(87) PCT Pub. No.: WO2008/019100
PCT Pub. Date: Feb. 14, 2008

(65) Prior Publication Data
US 2010/0331493 A1    Dec. 30, 2010

Related U.S. Application Data

(60) Provisional application No. 60/835,580, filed on Aug. 4, 2006.

(51) Int. Cl.
C08F 4/44    (2006.01)
(52) U.S. Cl.
USPC ............ 525/326.1; 526/100; 526/95; 526/90; 525/333.4; 525/331.5
(58) Field of Classification Search
USPC .................. 525/326.1, 333.4, 331.5; 526/90, 526/95, 100
See application file for complete search history.

(56) References Cited

U.S. PATENT DOCUMENTS

| | | | |
|---|---|---|---|
| 5,807,937 A * | 9/1998 | Matyjaszewski et al. | .... 526/135 |
| 6,610,802 B2 | 8/2003 | Roos et al. | |
| 6,759,491 B2 | 7/2004 | Matyjaszewski et al. | |
| 2004/0001892 A1 | 1/2004 | Healy | |
| 2006/0172983 A1 | 8/2006 | Bezwada | |

FOREIGN PATENT DOCUMENTS

| | | |
|---|---|---|
| JP | 2001-514697 | 9/2001 |
| JP | 2004-526854 | 9/2004 |
| WO | WO 98/40415 | 9/1998 |
| WO | WO 2006080928 A1 | 8/2006 |

OTHER PUBLICATIONS

Angot, S. et al., "Scope of the Copper Halide/Bipyridyl System Associated with Calixarene-Based Multihalides for the Synthesis of Well-Defined Polystyrene and Poly(meth)acrylate Stars," Macromolecules, 2000, 33(20), 7261-7274.

Ciampolini, M. et al., "Five-Coordinated High-Spin Complexes of Bivalent Cobalt, Nickel, and Copper with Tris(2-dimethylaminoethyl)amine," Inorg. Chem., 1966, 5(1), 41-44.
Curini, M. et al., N-Chlorination of Amides and Carbamates by Oxone® and Sodium Chloride, Synlett, 2000, 813-814.
Haddleton, D.M. et al., "Atom Transfer Radical Polymerization of Methyl Methacrylate Initiated by Alkyl Bromide and 2-Pyridinecarbaldehyde Imine Copper(1) Complexes, " J. Macromolecules, 1997, 30(7), 2190-2193.
Kamigaito, M. et al., Metal-Catalyzed Living Radical Polymerization, Chem. Rev., 2001, 101(12), 3689-3746.
Matyjaszewski, K. et al., "Atom Transfer Radical Polymerization," Chem. Rev., 2001, 101(9), 2921-2990.
Matyjaszewski, K. et al., "Synthesis and Characterization of Star Polymers with Varying Arm Number, Length, and Composition from Organic and Hybrid Inorganic/Organic Multifunctional initiators," Macromolecules, 1999, 32(20), 6526-6535.
Percec, V. et al., "Aqueous Room Temperature Metal-Catalyzed Living Radical Polymerization of Vinyl Chloride," J. Am. Chem. Soc., 2002, 124(18), 4940-4941.
Percec, V. et al., "Designing Functional Aromatic Multisulfonyl Chloride Initiators for Complex Organic Synthesis by Living Radical Polymerization," J. Polym. Sci. Part A: Polym. Chem., 2000, 38, 4776-4791.
Percec, V. et al., "Disulfonyl Chlorides: A Universal Class of Initiators for Metal Catalyzed 'Living' Diradical Polymerization of Styrene(s), Methacrylates and Acrylates," Macromolecules, 1997, 30(21), 6702-6705.
Percec, V. et al., "Living Radical Polymerization of Vinyl Chloride Initiated with Iodoform and Catalyzed by Nascent Cu⁰/TREN(PEI) in Water at 25° C Proceeds by a New Competing Pathways Mechanism," J. Polym. Sci. Part A: Polym. Chem., 2003, 41, 3283-3299.
Percec, V. et al., "N-Chloro Amides, Lactams, Carbamates and Imides. New Classes of Initiators for the Metal-Catalyzed Living Radical Polymerization of Methacrylates," J. Polym. Sci. Part A: Polym. Chem., 2005, 43, 5283-5299.
Percec, V. et al., "Universal iterative strategy for the divergent synthesis of dendritic macromolecules from conventional monomers by a combination of living radical polymerization and irreversible TERminator multifunctional INItiator (TERMINI)," J. Am. Chem. Soc., 2003, 125(21), 6503-6516.
Percec, et al., "Toward Self-Assembling Dendritic Macromolecules From Conventional Monomers by a Combination of Living Radical Polymerization and Irreversible Terminator Multifunctional Initiator", Journal of Polymer Science, Part A, Polymer Chemistry, vol. 42, No. 3, Dec. 12, 2003, 505-513.
Percec, et al., "Ultrafast Synthesis of Ultrahigh Molar Mass Polymers by Metal-Catalyzed Living Radical Polymerization of Acrylates, Methacrylates, and Vinyl Chloride Mediated by Set at 25 Deg C", Journal of The American Chemical Society, American Chemical Society, vol. 128, No. 43, Nov. 1, 2006, 14156-14165.
Wang, et al., "Controllable Selective Synthesis of a Polymerizable Prodrug of Cytarabien by Enzymatic and Chemical Methods", Bioorganic & Medicinal Chemistry Letters, vol. 15, No. 18, Sep. 15, 2005, 4064-4067.

* cited by examiner

Primary Examiner — Robert D. Harlan
(74) Attorney, Agent, or Firm — Woodcock Washburn, LLP

(57) ABSTRACT

The invention concerns a method of polymerizing an alkene monomer to produce a polymer using a catalyst that is Cu(O), $Cu_2Te$, $CuSe$, $Cu_2S$, $Cu_2O$, or a combination thereof, an initiator, and a component comprising a solvent and optional nitrogen-containing ligand, where the combination of the component and monomer is capable of diproportionating Cu(I)X into Cu(O) and Cu(II)X$_2$ where X is Cl, Br, or I.

28 Claims, 9 Drawing Sheets

LIVING RADICAL POLYMERIZATION OF ACTIVATED AND NONACTIVATED MONOMERS CONTAINING ELECTRON-WITHDRAWING SIDE GROUPS

CROSS-REFERENCE TO RELATED APPLICATIONS

This application is the National Stage of International Application No. PCT/US2007/017396, filed Aug. 3, 2007, which claims the benefit of U.S. Provisional Application No. 60/835,580, filed Aug. 4, 2006, the disclosures of which are incorporated herein by reference in their entirety.

FIELD OF THE INVENTION

The invention concerns polymerization of alkenes such as acrylates, acrylamides, styrenes and other vinyl containing aromatic groups, methacrylates, vinyl halides, halogenated acrylates, vinyl aldehydes, halogenated olefins and any other activated and nonactivated monomers containing electron withdrawing substituents.

BACKGROUND OF THE INVENTION

Conventional metal-catalyzed organic radical reactions and living radical polymerizations (LRP) performed in non-polar solvents, including atom-transfer radical polymerization (ATRP), proceed by an inner-sphere electron-transfer mechanism that require high activation energies. There is a need in the art for processes that can be performed at lower activation energies and, thus, lower temperatures.

SUMMARY OF THE INVENTION

In some embodiments, the invention concerns a method of polymerizing an alkene monomer to produce a polymer, the method comprising contacting said monomer with:

a catalyst that is $Cu(0)$, $Cu_2Te$, $CuSe$, $Cu_2S$, $Cu_2O$, or a combination thereof;

an initiator that is one or more of sulfonyl halides, nitrogen halides or compounds of the formula R—X, R'C(=O)OR", or R'—CN, where X is a halogen and R is $C_1$-$C_6$ alky, R' is a halogen-substituted $C_1$-$C_6$ alkyl, and R" is a $C_1$-$C_6$ alkyl; and a component comprising a solvent and optional nitrogen-containing ligand, where the combination of the component and monomer is capable of diproportionating $Cu(I)X$ into $Cu(0)$ and $Cu(II)X'_2$ where X' is Cl, Br, or I. It should be understood that any combination of monomer, solvent and optional ligand that diproportionates $Cu(I)X$ into $Cu(0)$ and $Cu(II)X_2$ will work in the methods of the instant invention.

In some preferred embodiments, the polymerization occurs in the presence of a nitrogen-containing ligand.

Some preferred solvents include water, alcohol, natural or synthetic polymeric alcohols, dipolar aprotic solvents, ethylene carbonate, propylene carbonate, ionic liquid, or a mixture thereof.

While other ligands such as dendrimeric polyamides and polyamines are suitable for the instant methods, preferred nitrogen containing ligand include one or more of those of the formula:

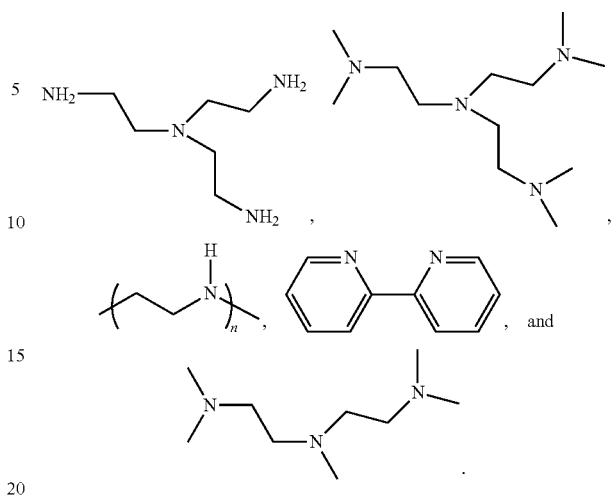

In some embodiments, the initiator is one or more of chloroform, bromoform, idoform, carbon tetrachloride, carbon tetrabromide, mono-, di- and trihalo-acetates and any other initiator that is suitable for the conventional metal catalyzed living radical polymerization including ATRP and compounds of the formula:

methyl 2-bromoproplonate (MBP)   methyl 2-chloroproplonate (MCP)

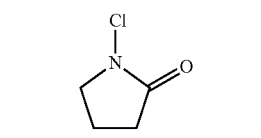

N-chloro-2-pyrrolidinone (NCP)

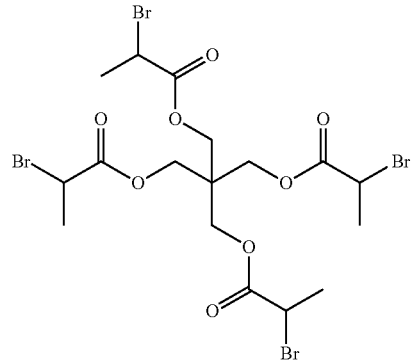

pentaerythritol tetrakis (2-bromopropionate) (4BrPr)

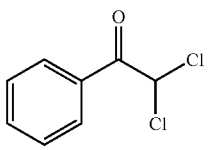 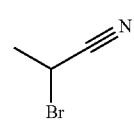

2,2-dichloroacetophenone (DCAP)   2-bromopropionitrile (BPN)

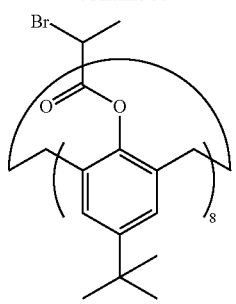

5, 11, 17, 23, 29, 35, 41, 47-octa-tert-butyl-49, 50, 51, 52, 53, 54, 55, 56-octakis-(2-bromoopropionyloxy)calyx[8]arene (8BrPr)

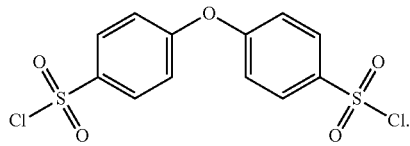

phenoxybenzene-4,4'-disulfonylchloride (PDSC)

Suitable alkene monomer include acrylates, halogenated acrylates, methylacrylates, halogen-substituted alkenes, acrylamides, methacrylamides, vinyl sulfones, vinyl ketones, vinyl sulfoxides, vinyl aldehydes, styrenes, and any other activated and nonactivated monomers containing electron withdrawing substituents.

These monomers may be substituted. In some embodiments, the monomers optionally contain functional groups that assist in the disproportionation of Cu(I)X into Cu(0) and Cu(II)X$_2$. Functional groups include amide, sulfoxide, carbonate, or onium.

Halogen-substituted alkenes include vinyl chloride, vinylidene chloride, vinyl fluoride, vinylidene fluoride, trifluoroethylene, trifluorochioroethylene or tetrafluoroethylene, hex afluoropropylene and fluorinated vinyl ethers.

In some embodiments, the methods may be advantageously practiced at about 35° C. or below, 25° C. or below, or 20° C. or below. In other embodiments, the reaction can be carried out at any higher temperature with a lower amount of catalyst.

Suitable initiators include halogen containing compounds. Examples of initiators include chloroform, bromoform, iodoform, carbon tetrachloride, carbon tetrabromide, hexahalogenated ethane, mono-di and trihaloacetates, acetophenones, halogenated amides and polyamides such as nylons, halogenated urethanes and polyurethane including their block copolymers such as Lycra®, halogenated imides, acetone, and any other initiators shown to work with conventional metal catalyzed living radical polymerization including ATRP and compounds of the formula:

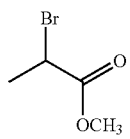 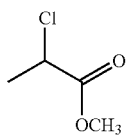

methyl 2-bromoproplonate (MBP)   methyl 2-chloroproplonate (MCP)

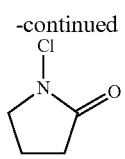

N-chloro-2-pyrrolidinone (NCP)

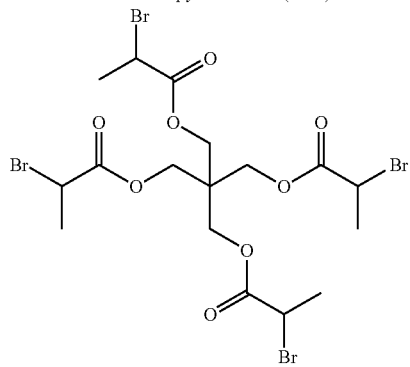

pentaerythritol tetrakis (2-bromopropionate) (4BrPr)

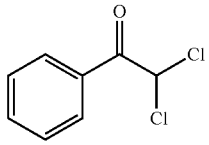 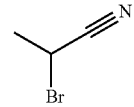

2,2-dichloroacetophenone (DCAP)   2-bromopropionitrile (BPN)

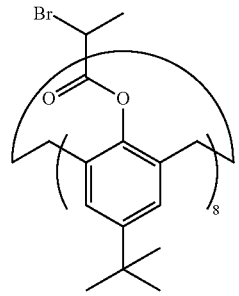

5, 11, 17, 23, 29, 35, 41, 47-octa-tert-butyl-49, 50, 51, 52, 53, 54, 55, 56-octakis-(2-bromoopropionyloxy)calyx[8]arene (8BrPr)

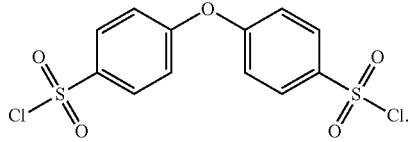

phenoxybenzene-4,4'-disulfonylchloride (PDSC)

Any combination of solvent or mixture of solvent and ligand that disproportionate Cu(I)X into Cu(0) and Cu(II)X$_2$ are suitable for use in the instant methods. In some embodiments, the solvent can be used also in only small amount since it can provide a catalytic effect. See, for example, FIG. 3. Thus, the solvent can act, not only as a solvent, but as a catalyst for the reaction. Furthermore, additional solvents, which may or may not provide a catalytic effect, can optionally be used in the reaction.

In certain embodiments, the solvent is a dipolar aprotic solvent. Preferred dipolar aprotic solvents include DMSO, DMAc, NMP, or DMF.

The amount of catalyst used in the instant invention is from about 100% to about 0.01%, based on moles, of the initiator. At low levels of catalyst the polymer can be used without further purification to remove the catalyst residues.

In some embodiments, the method further comprises isolating the polymer. Depending on the end use requirements and the amount of catalyst residue in the polymer, the polymer may be used without the need for further purification (when low levels of catalyst are used, for example).

In certain embodiments, the polymer produced by the processes described herein have a number average molecular weight of at least 500. In yet other embodiments, the polymer has a number average molecular weight of at least $10^6$.

A telechelic polymer is a polymer carrying functionalized endgroups. Such polymers are within the scope of the instant methods. Telechelic polymers can be used, for example in the synthesis of block co-polymers. In some embodiments, the polymers of the instant invention are telechelic polymers containing active halides. These telechelic polymers can be used as initiators for the synthesis of block copolymers or can be subsequently functionalized at the halide chain ends via conventional organic reactions to create other telechelic polymers. In some embodiments, the chain end concerns functionalization of a halide. Such polymers can be reacted by conventional means to produce a block copolymer.

In some embodiments, the polymers can be functionalized by other useful moieties. For example, the moiety may be a drug or pharmaceutical composition, such as FDA approved pharmaceuticals, are useful moieties.

Pharmaceuticals can also be incorporated by polymerization of drug carrying monomers and of reagents supported on monomers including monomeric solvents and FDA approved monomers.

The invention also concerns synthesis of dendrimers and hyperbranched polymers. Dendrimer are molecules have a tree-like or generational structure. A high level of synthetic control is needed in the production of these compositions. This control is achieved by step-wise reactions which create the molecule one layer at a time. The core of the dendrimer is a multifunctional molecule and further multifunctional molecules are used to create additional branch sites. Dendrimer can be made by divergent synthesis and convergent synthesis methods. Divergent synthesis assembles the molecule from the core to the periphery. Convergent synthesis assembles the molecule from the outside to termination at the core.

In one preferred embodiment, the invention concerns a method of polymerizing an alkene monomer to produce a polymer having a number average molecular weight of at least $10^6$, the method comprising contacting said monomer with:

Cu(0), $Cu_2Te$, CuSe, $Cu_2S$, $Cu_2O$, or a combination thereof;

a nitrogen-containing ligand;

an initiator that is one or more of sulfonyl halides, nitrogen halides or compounds of the formula R—X, R'C(=O)OR", or R'—CN, where X is a halogen and R is $C_1$-$C_6$ alky, R' is a halogen-substituted $C_1$-$C_6$ alkyl, and R" is a $C_1$-$C_6$ alkyl; and a solvent that is water, any alcohol or compound containing more than one OH groups including polysaccharides polymers and monomers, dipolar aprotic solvent, ethylene carbonate, propylene carbonate, or a mixture thereof;

wherein the solvent and nitrogen-containing ligand are capable of disproportionating Cu(I)X into Cu(0) and Cu(II)$X_2$ where X is F, Cl, Br or I where the disproportionation has an equilibrium constant of at least $10^6$ favoring the Cu(0) and Cu(II)$X_2$ species.

The invention also concerns the products made by the processes described herein.

MMA=1 mL, DMSO=0.5 mL, [MMA]$_0$=6.2 mol/L, and [MMA]$_0$/[PDSC]$_0$=200) using bpy as a ligand.

Figure 10:
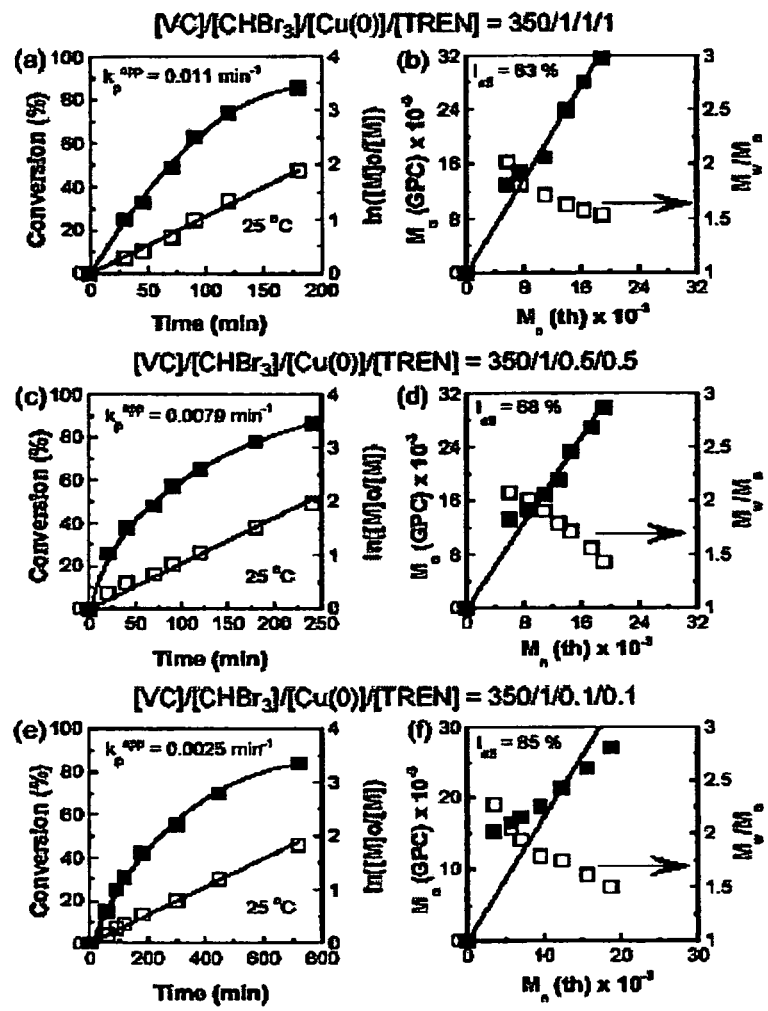

FIG. 10. Kinetic plots for the Cu(0) mediated living radical polymerization of VC initiated with CHBr$_3$ using TREN as a ligand (conditions: VC=2.2 g, DMSO=2 mL, [VC]$_0$=8.8 mol/L, and [VC]$_0$/[CHBr$_3$]$_0$=350).

Figure 11:
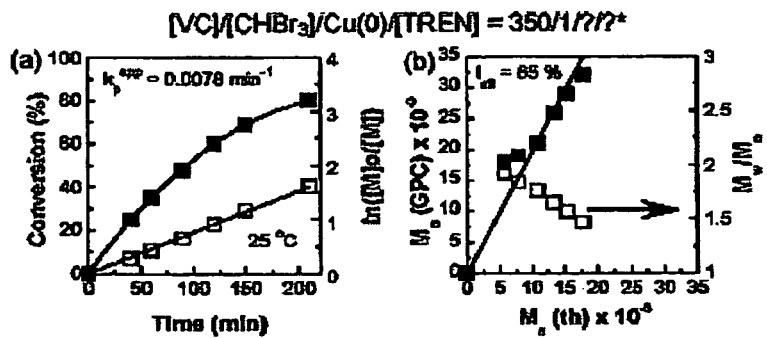

FIG. 11. Kinetic plots for the living radical polymerization of VC initiated with CHBr$_3$ using TREN as a ligand (conditions: VC=2.2 g, DMSO=2 mL, [VC]0=8.8 mol/L, and [VC]$_0$/ [CHBr$_3$]$_0$=350). * Cu(0) catalyst was used as a wire wrapped into the magnetic stirring bar.

Figure 12:
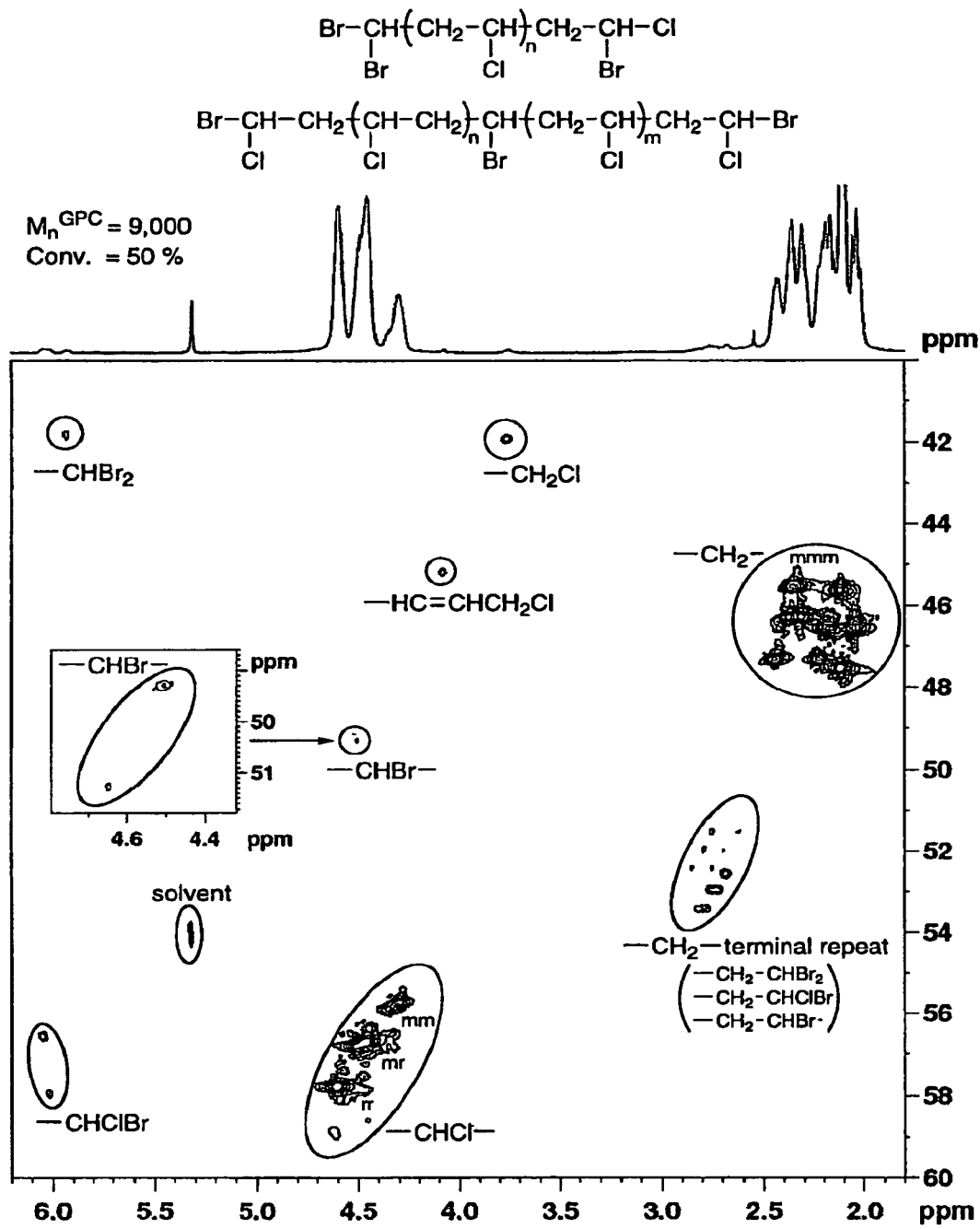

FIG. 12. HSQC spectrum in CD$_2$Cl$_2$ of polyvinylchloride containing a combination of dibromomethyl and bromochloromethyl chain ends in addition to allyl and chloromethyl structural defects (M$_n^{GPC}$=9,000, Mw/Mn=1.8, Conv.=80%). The sample was obtained by the Cu(0)/TREN/CuBr$_2$ catalyzed SET-LRP of VC in DMSO initiated with CHBr$_3$ at 25° C. Polymerization conditions were as follows: [VC]/[CHBr$_3$]/[Cu(0)]/[TREN]/[CuBr$_2$]=~70/1/0.25/~0.3/0.025, DMSO=4.0 mL, VC=1.8 g, [VC]$_0$=5.0 mol/L.

DISCUSSION OF THE INVENTION

In some embodiments, the invention concerns a method of polymerizing an alkene monomer to produce a polymer, the method comprising contacting said monomer with a catalyst that is Cu(0), Cu$_2$Te, CuSe, Cu$_2$S, Cu$_2$O, or a combination thereof; an initiator, and a component comprising a solvent and optional nitrogen-containing ligand, where the combination of the component and monomer is capable of disproportionating Cu(I)X into Cu(0) and Cu(II)X$_2$ where X is Cl, Br, or I. Any combination of suitable monomer, solvent and optional ligand that diproportionates Cu(I)X into Cu(0) and Cu(II)X$_2$ are suitable for use in the methods of the instant invention.

"Cu(0)" refers to copper in the zero oxidation state. "Cu(I)" and "Cu(II)" refer to copper in the +1 and +2 oxidation states respectively.

Solvents useful in the methods of the instant invention include water, alcohol, dipolar aprotic solvent, ethylene carbonate propylene carbonate, ionic liquid, or mixtures thereof. Alcohols include small molecule alcohols and polymeric alcohols. These alcohols may contain one or multiple hydroxyl groups. Suitable alcohols include C$_1$-C$_{12}$ alcohols that may be linear or branched. In some embodiments, preferred alcohols include C$_1$-C$_6$ alcohols. Suitable alcohols include methanol, ethanol, propanol, isopropanol, butanol, and tert-butanol, glycerine, carbohydrates such as monosaccharides, disaccharides, oligosaccharides and polysaccharides and any other natural and synthetic polymers containing OH groups. Dipolar aprotic solvents include dimethyl formamide (DMF), dimethyl acetamide (DMAC), dimethyl sulfoxide (DMSO), N-methylpyrrolidone (NMP). Polymeric solvent are also suitable.

As used herein "ionic liquid" refers to a salt having a cation and an anion where the salt is a liquid at ambient or near ambient temperatures. In some embodiments, the material has a melting point, or melting range, below about 100° C. Ionic liquids may comprise two or more different salts. In some embodiments, the ionic liquid can be hydrated or solvated. Examples of ionic liquids include aluminum(III) chloride in combination with an imidazolium halide, or imidazolium containing non-nucleophilic anions such as tetrafluoroborate or hexafluoroantimonate, or hexafluorophosphate, a pyridinium or a phosphonium halide, tetrafluoroboratee, or hexafluoroantimonate or hexafluorophosphate. The compositions include 1-ethyl-3-methylimidazolium chloride, N-butylpyridinium chloride and tetrabutylphosphonium chloride. An example of a known ionic liquid system is a mixture of 1-ethyl-3-methylimidazolium chloride and aluminium(III) chloride or 1-ethyl-3-methylimidazolium hexafluorophosphate or tetrafluoroborate.

A wide variety of nitrogen-containing ligands are suitable for use in the instant invention. These compounds include primary, secondary, and tertiary alkyl amines, as well as aromatic amines, linear and branched polyethylene imine), dendritic polyamines and polyamides. Suitable nitrogen-containing ligands include the compounds of the following structures.

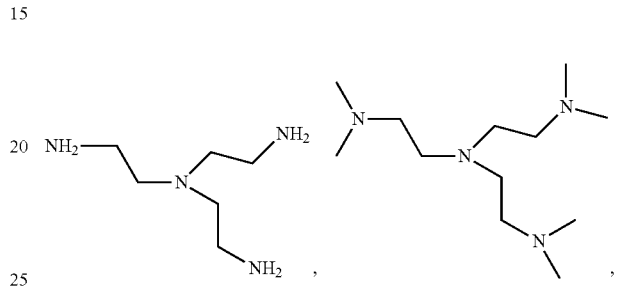

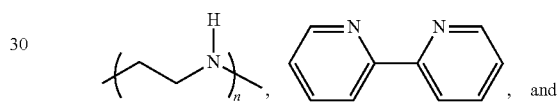

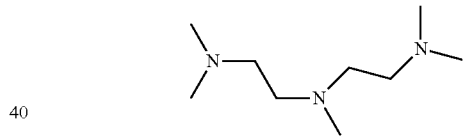

A wide variety of initiators are suitable for use in the instant invention. Halogenated compounds are particularly suited for use in the invention. These initiators include compounds of the formula R—X or R'C(=O)OR" where X is a halogen and R is C$_1$-C$_6$ alloy, R' is a C$_1$-C$_6$ alkyl substituted with one or more halogen atoms, and R" is a C$_1$-C$_6$ alkyl. Suitable initiators include chloroform, bromoform, idoform, carbon tetrachloride, carbon tetrabromide and compounds of the formula:

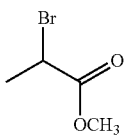 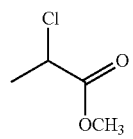

methyl 2-bromoproplonate (MBP)  methyl 2-chloroproplonate (MCP)

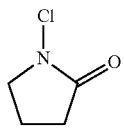

N-chloro-2-pyrrolidinone (NCP)

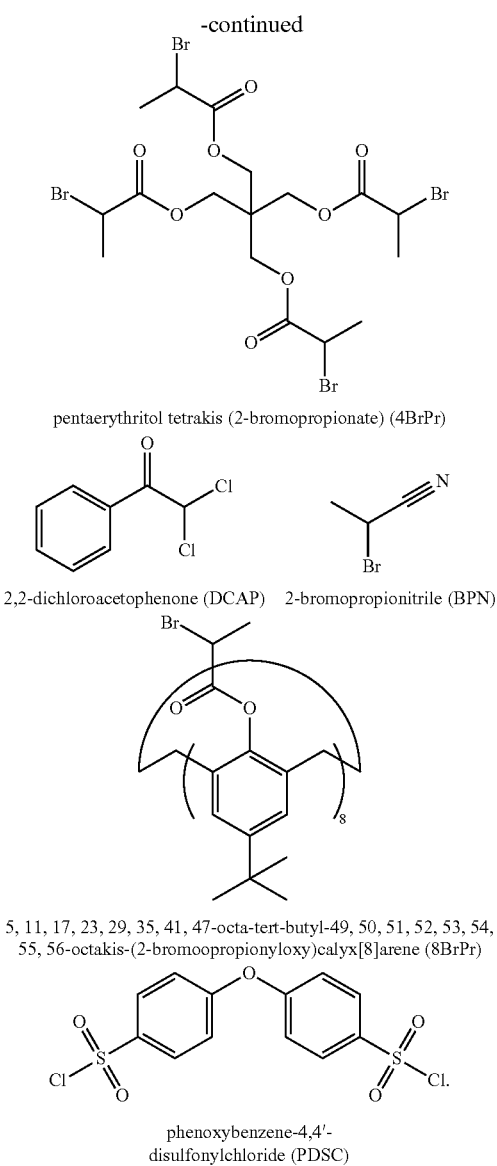

In some preferred embodiments, the initiator is an alkyl, sulfonyl, or nitrogen halide. The nitrogen halide can be also a halogenated nylon, peptide or protein. Alternatively a polymer containing active halide groups such as the structural defects of poly(vinyl chloride), the chloromethyl group of poly(chloromethyl styrene) of other polymers and copolymers can also be used as initiators.

Initiators shown to work in conventional metal catalyzed living metal polymerizations will also work with the instant methods. Such compositions are well known by those skilled in the art. See, for example, Percec, V.; Popov, A. V.; Ramirez-Castillo, E.; Monteiro, M.; Barboiu, B.; Weichold, O.; Asandei, A. D.; Mitchell, C. M. J. Am. Chem. Soc. 2002, 124, 4940-4941; Percec, V.; Popov, A. V.; Ramirez-Castillo, E.; Weichold, O. J. Polym. Sci. Part A: Polym. Chem. 2003, 41, 3283-3299; Percec, V.; Kim, H.-J.; Barboiu, B. Macromolecules 1997, 30, 6702-6705; V. Percec, C. Grigoras, J. Polym. Sci.: Part A: Polym. Chem, 2005, 43, 5282-5299; and V. Percec, B. Barboiu, T. K. Bera, M. van der Sluis, R. B. Grubbs, J. M. J. Fréchet, J. Polym. Sci.: Part A: Polym. Chem. 2000, 38, 4776-4791; Kamigaito, M.; Ando, T.; Sawamoto, M. Cherm. Rev. 2001, 101, 3689-3746; Matyjaszewski, K.; Xia, J. Chem. Rev. 2001, 101, 2921-2990.

In some embodiments, when the term "halide" is used herein, preferred halides include Cl, Br, F, or I.

Metal-catalyzed living radical polymerization (LRP) initiated with alkyl sulfonyl, and N-halides has been accomplished in organic and aqueous media as well as in ionic liquids, mostly for activated monomers such as styrene, acrylates, methacrylates, and acrylonitrile. Polymers with complex architecture, such as dendritic macromolecules, have also been synthesized by metal catalyzed LRP (Percec, V.; Barboiu, B.; Grigoras, C.; Bera, T. K. J. Am. Chem. Soc. 2003, 125, 6503-6516).

Metal-catalyzed LRP is considered to proceed via an inner-sphere redox process in which a low oxidation state metal complex acts as a catalyst, mediating a fast exchange between radicals and their dormant alkyl halide species. The equilibrium between active and dormant species is shifted toward the dormant species via an excess of high oxidation state catalyst generated by a small extent of bimolecular radical dimerization during the initial stages of the polymerization. This concept is known as internal suppression of fast reactions or persisten radical effect (PRE). The inner-sphere radical process is called atom-transfer-radical-addition (ATRA). The corresponding radical polymerization was therefore, named atom-transfer-radical-polymerization (ATRP). Non-activated monomers that generate stable alkyl halide dormant species such as vinyl acetate, vinyl chloride, and ethylene do not and are not expected to polymerize by the current generation of ATRP catalysts. Of specific interest is vinyl chloride (VC) because it cannot be polymerized via any living mechanism. Recently, the metal-catalyzed LRP of VC initiated by $CHI_3$ and mediated via a competition between outer-sphere single-electron-transfer (SET) and degenerative chain transfer (DT) mechanisms (SET-DTLRP) was reported.

The polymerization processes of the present invention proceed at 25° C. in $H_2O$ and uses as catalyst Cu(0) and/or "nascent" Cu(0) generated in situ via the disproportionation of various Cu(I) precursors. In this polymerization, Cu(0) species act as electron-donors, and the initiator and dormant propagating species as electron-acceptors. The Cu(I) species generated during the formation of radicals disproportionate spontaneously into extremely reactive nascent Cu(II) and Cu(0) species that mediate the initiation and the reversible termination. This disproportionation generates, via a self-regulated mechanism, in situ, the Cu(II) species that, in the case of VC, would not be accessible via a conventional PRE mechanism since the radical polymerization of VC is dominated by chain transfer to monomer rather than bimolecular termination. By this mechanism, the inactive Cu(I) species are spontaneously consumed and the catalytically active Cu(0) species are continuously produced. Here we report that, under suitable conditions, the DT part of the SET-DTLRP can be eliminated and the newly elaborated LRP becomes SET-LRP. This polymerization process takes place in $H_2O$, protic, dipolar aprotic, and other polar solvents that in presence of N-ligand were discovered to disproportionate Cu(I) into Cu(0) and Cu(II), and in addition, favor a SET process. SET-LRP occurs under very mild reaction conditions, at room temperature and below, uses a catalytic rather than a stoichiometric amount of catalyst, and although proceeds ultrafast, generates polymers with unprecedently high molecular weight. SET-LRP is general and applies to both nonactivated and activated monomers containing electron-withdrawing groups, such as vinyl chloride and other halogenated monomers, acrylates, and methacrylates. It also applies to organic reactions and tolerates a diversity of functional groups.

Selecting Catalysts.

A schematic mechanism for SET-LRP is shown in Scheme 1.

Scheme 1. Simplified mechanism of SET-LRP.

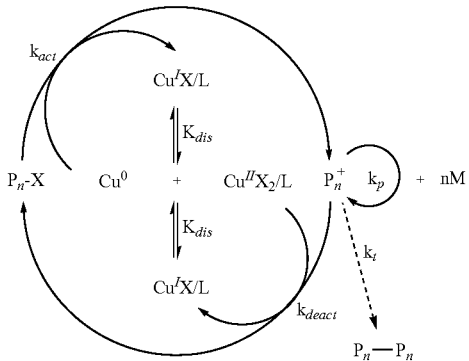

The initiation (activation) step ($k_{act}$) is mediated by a SET from the electron-donor (Cu(0) or other species) to the electron-acceptor (alkyl halide, sulfonyl halide, or N-halide initiator). Subsequently, the Cu(I) generated in this step disproportionates instantaneously into Cu(II) and Cu(0) species. The disproportionation of Cu(I) in $H_2O$ can proceed in the presence of chelating compounds with an equilibrium constant of $10^6$. Cu(I) disproportionates spontaneously in $H_2O$ in the presence of tris(2-aminoethyl)amine (TREN) and poly (ethylene imine) (PEI). The very reactive "nascent" Cu(II) species generated from the disproportionation reaction provide the reversible deactivation ($k_{deact}$) of the radicals into dormant alkyl halide species. Cu(0) promotes the reactivation of the dormant species. Both processes occur via a SET mechanism. In order to assess the electron-donating character of Cu(0) and other Cu(I) species, their EHOMO were calculated. Table 1 reports the EHOMO in electron volts (ev) for Cu(0), CuCl, CuBr, CuI, $Cu_2O$, $Cu_2S$, $Cu_2Se$, and $Cu_2Te$. Cu(0) is known to be an efficient single-electron-donor agent. In addition, $Cu_2O$, $Cu_2S$, $Cu_2Se$, and $Cu_2Te$ have been investigated since they were developed in our laboratory as the most efficient self-regulated catalysts for LRP initiated with sulfonyl halides and N-halides in nonpolar, and polar solvents, in ionic liquids, and for SET-DTLRP of VC in $H_2O$. Their mechanism of catalysis is, however, not known for any of the previously reported LRP reactions. CuCl, CuBr, and CuI were studied because, in the reaction mechanism outlined in Scheme 1, depending on the structure of the initiator, they are believed to be transient, inactive species. The results are shown in Table 1.

TABLE 1

Ionization Potentials of Various Cu Catalysts Calculated Using HF/DFT Methods

| EHOMO (eV) | Catalyst | Calculation Method |
|---|---|---|
| −7.00 | Cu2Te | HF/LACVP+*//B3LYP/LACVP* |
| −7.34 | Cu2Se | HF/6-31+G*//B3LYP/6-31G* |
| −7.62 | Cu(0) | UHF/6-31+G*//UB3LYP/6-31G* |
| −7.67 | Cu2S | HF/6-31+G*//B3LYP/6-31G* |
| −8.26 | Cu2O | HF/6-31+G*//B3LYP/6-31G* |

TABLE 1-continued

Ionization Potentials of Various Cu Catalysts Calculated Using HF/DFT Methods

| EHOMO (eV) | Catalyst | Calculation Method |
|---|---|---|
| −8.84 | CuI | HF/6-31+G*//B3LYP/6-31G* |
| −9.71 | CuBr | HF/6-31+G*//B3LYP/6-31G* |
| −10.24 | CuCl | HF/LACVP+*//B3LYP/LACVP* |

The most efficient electron-donor SET catalysts are $Cu_2Te$ followed by $Cu_2Se$, Cu(0), $Cu_2S$ and $Cu_2O$. CuI, CuBr, and specifically CuCl are very poor electron donors although they are catalysts of choice for ATRA and ATRP. Since the lifetime of Cu(I)X is very short in comparison with that of Cu(0) and $Cu(II)X_2$ species, during reaction conditions that favor disproportionation of Cu(I) into Cu(II) and Cu(0), the SET catalytic activity of Cu(I)X halides can be neglected. Therefore, $Cu_2Te$, $Cu_2Se$, Cu(0), $Cu_2S$, and $Cu_2O$ are expected to provide the best catalysts for the SET-LRP.

Selecting Ligands and Solvents.

Figure 1:
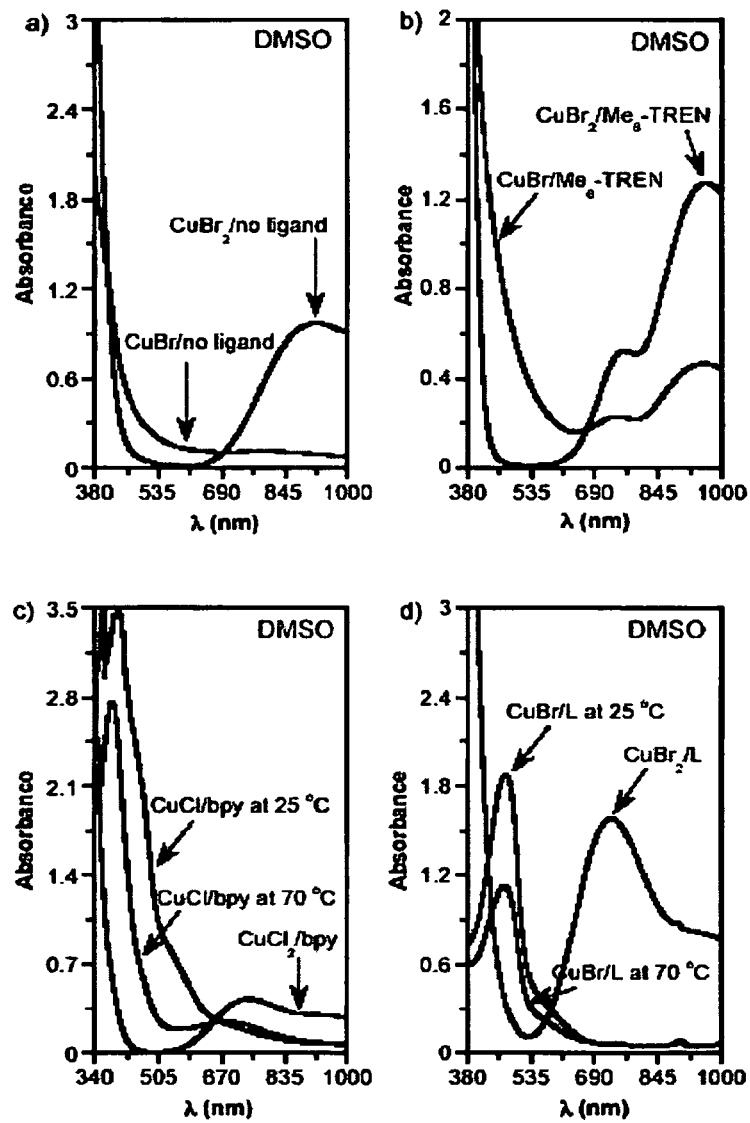
FIG. 1. UV-VIS spectra of a) $CuBr_2$ (0.01 mmol/mL) and CuBr (0.01 mmol/mL) in DMSO (both $CuBr_2$ and CuBr are soluble in DMSO without ligand), b) $CuBr_2$/$Me_6$TREN (0.01 mmol/ml) and CuBr/$Me_6$Tren (0.01 mmol/ml) in DMSO, UV-VIS spectra of $CuCl_2$/bpy, 1/3 (0.005 mmol/mL) and CuCl/bpy, 1/3 (0.005 mmol/mL) in DMSO; at 25° C., 12 h; at 70° C., 12 h, d) $CuBr_2$/N-n-propyl-2-pyridylmethanimine, 1/2 (0.01 mmol/ml solution) and CuBr/N-n-propyl-2-pyridylmethanimine (0.005 mmol/mL) in DMSO; at 25° C., 12 h and at 70° C., 12 h.

A UV spectroscopy study was performed to assess the activity of various solvents, in addition to $H_2O$, and ligands for the disproportionation of Cu(I) into Cu(II) and Cu(0). Representative examples of UV experiments are shown in FIG. 1.

Deaerated solutions containing solvent, ligand, and Cu(I)X or $Cu(II)X_2$ were prepared and their UV spectra were recorded immediately. The $Cu(II)X_2$ solution was used as a standard to assess the disproportionation of Cu(I)X. FIG. 1a shows that, in the absence of a ligand, CuBr does not disproportionate in DMSO. However, complete and instantaneous disproportionation of CuBr into $CuBr_2$ and Cu(0) occurs in the presence of tris(2-dimethylaminoethyl)amine ($Me_6$-TREN) in DMSO (FIG. 1b). When $Me_6$-TREN was replaced with 2,2'-bipyridine (bpy), disproportionation of CuCl was also observed in DMSO, but it was not as fast as in the presence of Me6-TREN in DMSO (FIG. 1c). However, N-n-propyl-2-pyridyl-methanimine in DMSO does not disproportionate CuBr (FIG. 1d). $Me_6$TREN, TREN, PEI, bpy, N,N,N',N'',N''-pentamethyldiethylenetriamine (PMDETA), and many other N-ligands that bind Cu(II) species disproportionate Cu(I)X into $Cu(II)X_2$ and Cu(0) not only in $H_2O$, but also in protic solvents (MeOH, EtOH, ethylene glycol, diethylene glycol, triethylene glycol, 2-(2ethoxyethoxy)ethanol, tetraethylene glycol, glycerine, phenol), dipolar aprotic solvents (DMSO, DMF, DMAc, NMP, etc.), ionic liquids and ethylene carbonate, but not in $CH_3CN$. Therefore, any combination of catalyst, ligand, and solvent that was discovered here to favor disproportionation of Cu(I) into Cu(0) and Cu(II) is expected to be efficient in mediating SET-LRP.

Selecting Initiators.

The inner-sphere atom transfer mechanism is known to show a strong dependence of the metal catalyzed $k_{act}$ on the nature of the halogen from the structure of R—X. In two independent series of experiments the ratio, $k_{act}$(R—Br)/$k_{act}$(R—Cl) was in the range of 103 to $9 \times 10^4$. However, in the case of the outer-sphere mechanism, $k_{act}$ has a much smaller dependence on the nature of the halogen from R—X. For example the ratio, $k_{act}$(R—I)/$k_{act}$(R—Br)~$k_{act}$(R—Br)/$k_{act}$(R—Cl)~1 to 10. Based on these data, it is expected that the range of initiators available for the case of metal mediated SETLRP must be much broader than that for the case of metal mediated inner-sphere process. Alkyl halides, sulfonyl halides, and N-halides containing Cl, Br, and I as the halide must be efficient in the case of SETLRP. In the case of metal-catalyzed inner-sphere ATRP iodine-containing initiators undergo a competition between inner-sphere and degenerative transfer.

SET-LRP of Acrylates Initiated with Methyl-2-Bromopropionate (MBP) and 2-bromopropionitrile (BPN) and Catalyzed with Cu(0)/Me$_6$-TREN in DMSO.

Cu(0)/bpy catalyzed LRP of methacrylates initiated with sulfonyl halides in nonpolar solvents at high temperatures was reported from our laboratory and was shown to be accelerated by many additives including ethylene glycol. Mixtures of Cu(0)/Cu(II)X$_2$ or even Cu(0) alone were used to catalyze the LRP initiated with alkyl halides at high temperature in bulk and in nonpolar solvents. It was concluded that Cu(0) increases the rate of reaction since it reduces Cu(II)X$_2$ to Cu(I)X, the latter being considered the catalyst. Cu(0) alone was shown to provide poor control of molecular weight and molecular weight distribution since the Cu(I)X species generated cannot react with radicals to produce the dormant alkyl halides.

Figure 2:
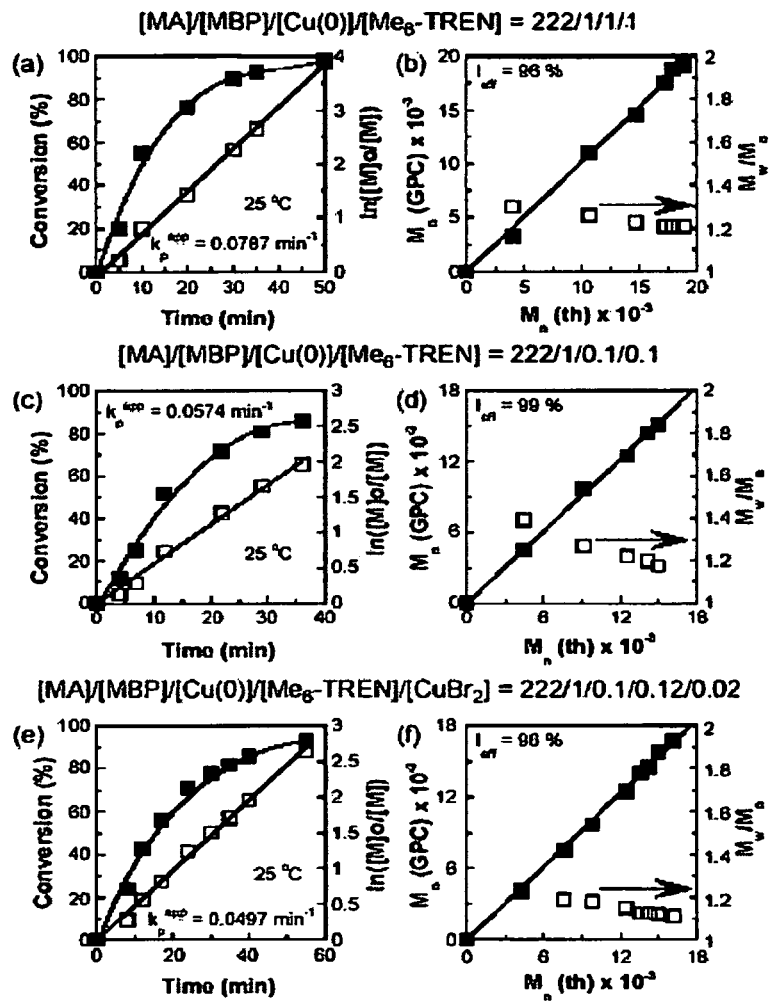
FIG. 2. Kinetic plots for the Cu(0) mediated living radical polymerization of methyl acrylate (MA) at 25° C. in DMSO, initiated with methyl 2-bromopropionate (MBP) using $Me_6$-TREN as a ligand (conditions: MA=2 mL, DMSO=1 mL, $[MA]_0$=7.4 mol/L, and $[MA]_0/[MBP]_0$=222).

FIG. 2 shows examples of LRP of methyl acrylate (MA) catalyzed by MBP/Cu(0)/Me$_6$-TREN carried out at 25° C. in DMSO. Complete conversions are obtained in less than 50 min for [MBP]$_0$/[Cu(0)]$_0$=1/1 (mole/mole) (FIG. 2a, b). The reaction time is similar when [MBP]$_0$/[Cu(0)]$_0$=1/0.1 (mole/mole) (FIG. 1c, d) and even when some excess of CuBr$_2$ is added (FIG. 2e, f). In all cases, kinetic plots show internal first order of reaction in monomer and growing species, and the resulting poly(methyl acrylate) (PMA) has low molecular weight distribution. The amount of catalyst used is decreased from 100% versus initiator to 10% and even to 1%. Below 10% catalyst the reaction mixture is colorless.

External Orders of the Polymerization in Cu(0), CuBr$_2$, and DMSO Concentration.

Figure 3:
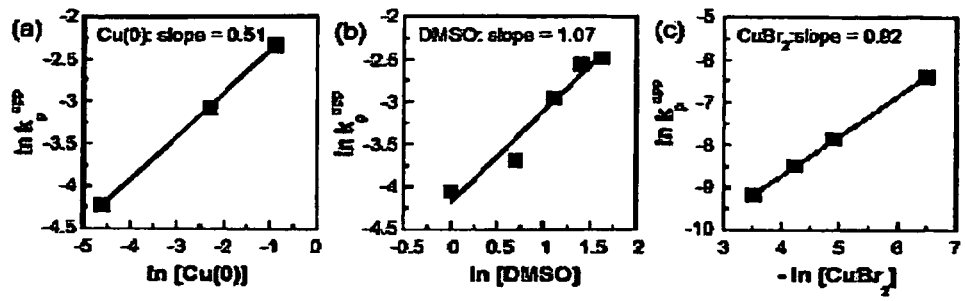
FIG. 3. Determination of the external order of reaction in Cu(0), $CuBr_2$ and DMSO for the Cu(0)/$Me_6$-TREN-catalyzed polymerization of methyl acrylate (MA) in DMSO at 25° C. initiated with methyl 2-bromopropionate (MBP). [MA]/[MBP]=200/1; a) ln $k_p^{app}$ vs ln [Cu(0)], ratio [Cu(0)]/[MA] was varied from 0.01 to 1 at an equal ratio of [Cu(0)]/[$Me_6$-TREN] (MA=2 mL, DMSO=1 mL, $[MA]_0$=7.4 mol/L); b) $k_p^{app}$ vs [DMSO], DMSO was varied from 0.2 to 0.8 mL at 1.8 mL of MA. ([MA]/[MBP]/[$Me_6$-TREN]/[Cu(0)]=200/1/0.4/0.4); c) $k_p^{app}$ vs −ln [$CuBr_2$], ratio of [$CuBr_2$]/[Cu(0)] was varied from 0.1 to 2, [$Me_6$-TREN] was equal to sum of [Cu(0)] and [$CuBr_2$]. ([MA]/[MBP]/[Cu(0)]=200/1/0.4).

Kinetic experiments, used according to the procedure reported previously, provided the external orders of reaction of the polymerization in [Cu(0)], [DMSO], and [CuBr$_2$] (FIG. 3). As expected for the mechanism illustrated in Scheme 1, a complex, less than one, order of reaction in [Cu(0)] is observed. The orders of reaction in [DMSO] and [CuBr$_2$] are about one. This demonstrates the expected catalytic effect of DMSO in this reaction and the capability of performing the LRP in the presence of a high concentration of CuBr$_2$ at a reasonable high rate. These data provide instructions on how to control the rate of polymerization. For example, the amount of DMSO used in these experiments can be less than the amount of monomer and therefore, the reaction mixture can only be diluted with solvent. Under these conditions only small amount of DMSO is required to mediate this polymerization.

Synthesis of Ultrahigh Molecular Weight PMA by Cu(0)/Me6-TREN Catalyzed LRP Initiated with MBP.

The simplest test of the efficiency of a living polymerization is to assess its ability to synthesize polymers with ultrahigh molecular weight i.e., with number average molecular weight (Mn) larger than 10$^6$. Previously the highest molecular weight linear polymers synthesized by LRP metal-catalyzed technique were Mn=300,000 for poly(n-butylmethacrylate), Mn=367,000 for poly(methylmethacrylate), Mn=554,000 for poly(methylacrylate), and Mn=823,000 for poly(tertbutylacrylate).

Figure 4:
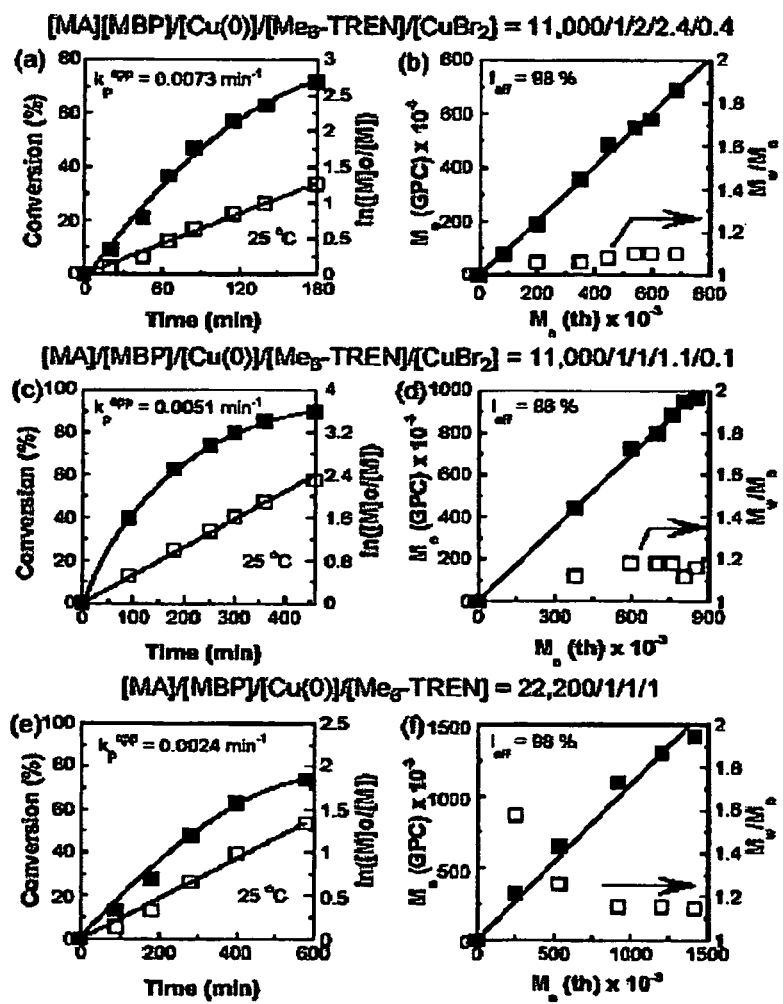
FIG. 4. Kinetic plots for the Cu(0) mediated living radical polymerization of MA initiated with methyl 2-bromopropionate (MBP) at 25° C. in DMSO using $Me_6$-TREN as a ligand (conditions: a to b) MA=2.5 mL, DMSO=2.5 mL, $[MA]_0$=5.55 mol/L, and $[MA]_0/[MBP]_0$=11,000; c to d) MA=5 mL, DMSO=2.5 mL, $[MA]_0$=7.4 mol/L, and $[MA]_0/[MBP]_0$=11,000; e to f) MA=2 mL, DMSO=4 mL, $[MA]_0$=3.7 mol/L, and $[MA]0/[MBP]_0$=22,200).

FIG. 4 shows representative examples of kinetic experiments in which [MA]$_0$/[MBP]$_0$=11,000 (FIG. 4a, b, c, d) and 22,200 (FIG. 4e, f). PMA with Mn=690,000 (Mw/Mn=1.10), 950,000 (Mw/Mn=1.12), and respectively 1,420,000 (Mw/Mn=1.15) and narrow molecular weight distributions were obtained in 3 h, 6 h, and respectively 10 h. The much higher molecular weight polymers obtained by SET-LRP suggests much less termination at much higher rate than in previous metal-catalyzed LRP performed in molar media. These are remarkable results considering that the reaction conditions used were not optimized. Radical polymerizations and LRP of acrylates are known to be accompanied by intramolecular chain transfer to polymer and therefore, to produce branched polyacrylates when the reaction is performed at high temperatures. The analysis of the HMQC and HMBC spectra of linear poly(n-butylacrylate) made at 25° C. revealed that branching in this sample is less than 1%. A linear PMA, free of branching, was obtained in the polymerization executed at 25° C.

CHCl$_3$, CHBr$_3$, and CHI$_3$ as Bifunctional Initiators for the LRP of MA

Figure 5:
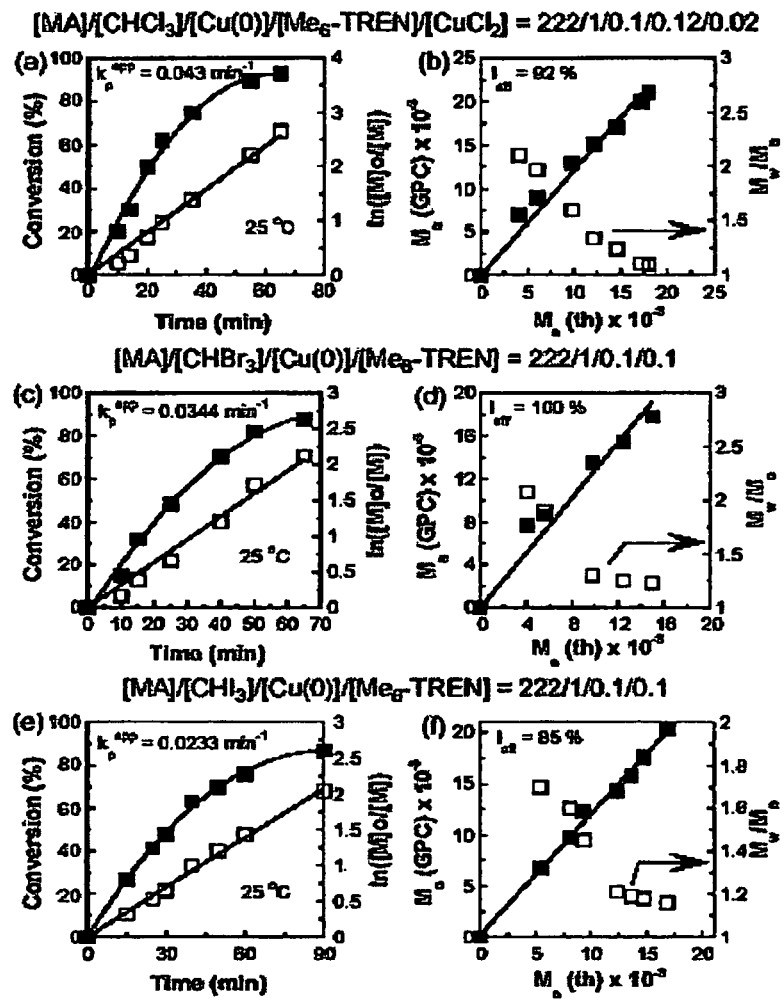
FIG. 5. Kinetic plots for the Cu(0) mediated living radical polymerization of MA initiated from: $CHCl_3$, $CHCBr_3$, $CHI_3$ using $Me_6$-TREN as a ligand (conditions: a to b) MA=1 mL, DMSO=1 mL, [MA]0=5.55 mol/L, and $[MA]0/[CHCl_3]_0$=222; c to d) MA=1 mL, DMSO=1 mL, $[MA]_0$=5.55 mol/L, and $[MA]_0/[CHBr_3]_0$=222; and e to f) MA=2 mL, DMSO=1 mL, $[MA]_0$=7.4 mol/L, and $[MA]_0/[CHI_3]_0$=222).

Catalyzed by Cu(0), Cu$_2$Te, Cu$_2$Se, Cu$_2$S, Cu$_2$O/Me$_6$-TREN in DMSO. The simplest difunctional initiators for the synthesis of α,ω-difunctional telechetic polyacrylates are CHCl$_3$, CHBr$_3$, and CHI$_3$. FIG. 5 shows kinetic experiments for all initiators and Cu(0)/Me$_6$-TREN catalyst. Only CHCl$_3$ requires a small amount of CuCl$_2$ additive to control the LRP. The most important message provided by this figure is that regardless of the structure of the haloform, the apparent rate constant of propagation (kp) does not depend strongly on the structure of the halogen. Although this is a complex rate constant, its trend resembles that observed in other SET mediated processes and differs from that seen in ATRA and ATRP.

Synthesis of Ultrahigh Molecular Weight PMA by Cu(0)/Me6-TREN Catalyzed LRP Initiated with Haloforms.

Figure 6:
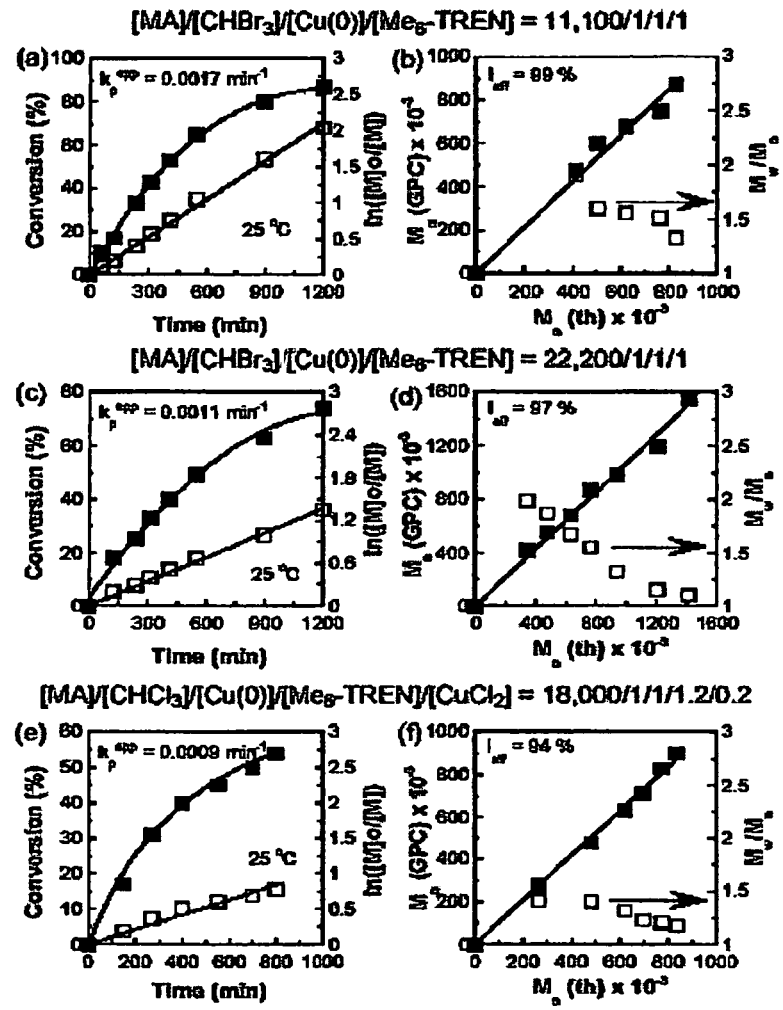
FIG. 6. Kinetic plots for the Cu(0) mediated living radical polymerization of MA initiated from $CHBr_3$ using $Me_6$-TREN as a ligand (conditions: MA=2 mL, DMSO=4 mL, $[MA]_0$=3.7 mol/L; a to b) $[MA]_0/[CHBr_3]_0$=11,100; c to d) $[MA]_0/[CHBr_3]_0$=22,200; e to f) $[MA]_0/[CHCl_3]_0$=18,000).

The bifunctional initiators CHBr$_3$ and CHCl$_3$ were used to demonstrate the synthesis of ultrahigh molecular weight PMA (FIG. 6). The bifunctional haloform initiators CHBr$_3$ and CHCl$_3$ were also tested for the synthesis of ultrahigh molecular weight linear PMA. The results of selected kinetic experiments using these initiators are presented in the FIG. 6.

PMMA with Mn up to 1,400,000 and narrow molecular weight distribution are easily accessible in reasonable reaction time. CHCl$_3$ initiator gives the best results when a small amount of CuCl$_2$ additive was used to regulate the polymerization. The nature of the haloform does not change significantly the kinetic parameters (including k$_p^{app}$) of these polymerizations under similar reaction conditions. This observation was also valid (wide supra) when various haloforms were employed for the synthesis of low molecular weight PMA (FIG. 5). The use of these easily available and inexpensive solvents as bifunctional initiators for the synthesis of ultrahigh molecular weight PMA might be attractive from industrial point of view and for the synthesis of ABA block copolymers that are not accessible with monofunctional initiators such as MBP.

Synthesis of Ultrahigh Molecular Weight 8- and 4-Arm Star PMA.

Figure 7:
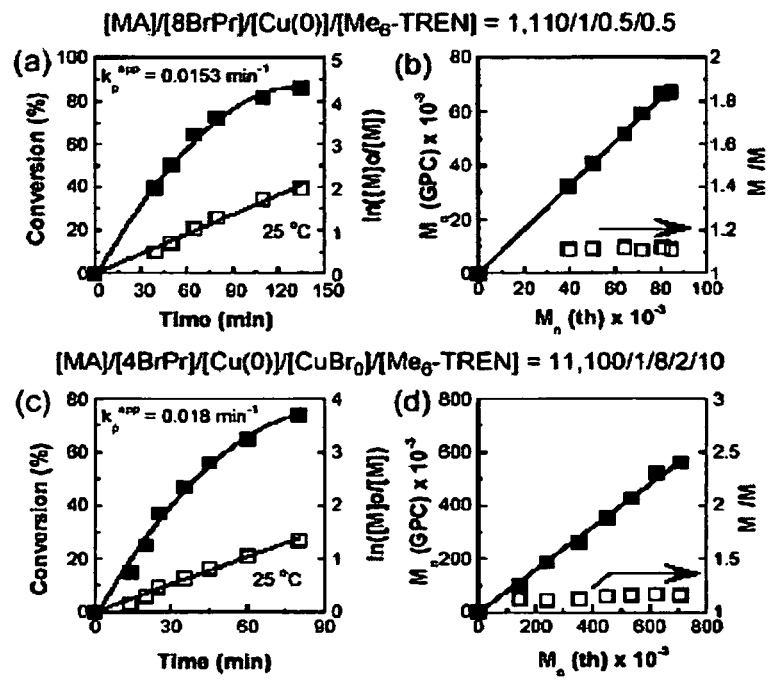
FIG. 7. Kinetic plots for the living radical polymerization of MA initiated with a to b) (8BrPr) 5,11,17,23,29,35,41,47-octa-tert-butyl-49,50,51,52,53,54,55,56-octakis-(2-bromopropionyloxy)calyx[8]arene (conditions: MA=1 mL, DMSO=0.5 mL, [MA]0=7.4 mol/L, and [MA]0/[8BrPr]0=11,100); c to d) (4BrPr) pentaerythritol tetrakis(2-bromopropionate) (conditions: MA=2.5 mL, DMSO=2.5 mL, [MA]0=5.55 mol/L, and $[MA]_0/[4BrPr]_0$=11,100) using $Me_6$-TREN as a ligand.

The Cu(0) based catalytic system was also utilized for the synthesis of 4- and 8-arm star PMA. The bromopropionate based 4armed (4BrPr derived from pentaerithritol) and 8-armed (8BrPr derived from 4-tert-butyl calyx[8]arene) initiators were used in these experiments. Representative kinetic plots of LRP of MA initiated with 4BrPr and 8BrPr star shape initiators are shown in the FIG. 7.

In all experiments, the monomer conversion reaches up to 90%. The plots of ln[MA]$_0$/[MA] as a function of time and that of experimental versus theoretical Mn increase linearly. The Mw/Mn values remain very low throughout the polymerization. These results indicate the living nature of these polymerizations and the absence of star-star coupling as well as other side reactions. It is remarkable that both 4- and 8-arm star PMA with Mn up to 1,000,000 can be obtained in a living manner at room temperature in a relatively short time. The decreased catalyst concentration (FIGS. 7a and 7b) as well as the use of a small amount of CuBr₂ as additive (FIGS. 7c and 7d) provides an excellent control over polymerization yielding high molecular weight 4- and 8-arm PMA with low molecular weight distribution. Reports on the synthesis of multi arm star polyacrylates and polymetacrylates using the same 4BrPrRef and 8BrPrRef and other multifunctional initiators under inner-sphere metal-catalyzed conditions are available. All previous synthetic procedures required high polymerization temperatures, long reaction times and were performed in nonpolar solvents.

LRP of MA Initiated with Haloforms and Catalyzed by Cu(0), Cu₂O, Cu₂S, Cu₂Se, Cu₂Te/TREN in DMSO.

Figure 8:
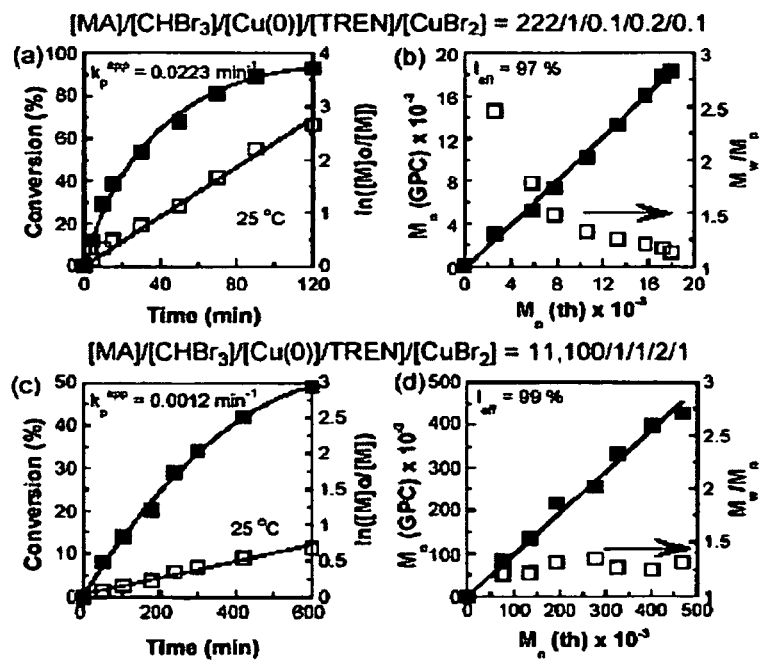
FIG. 8. Kinetic plots for the Cu(0) mediated living radical polymerization of MA initiated from $CHBr_3$ using TREN as a ligand (conditions: a to b) MA=2 mL, DMSO=1 mL, $[MA]_0$=7.4 mol/L, and $[MA]_0/[CHBr_3]_0$=222; c to d) MA=2 mL, DMSO=2 mL, $[MA]_0$=5.55 mol/L, and $[MA]_0/[CHBr_3]_0$=11,100).

The simplest and the least expensive ligands that can be used in this LRP are TREN and PEI. They were previously used in the LRP of VC in H₂O together with the same catalysts. FIG. 8 provides several examples of kinetics that demonstrate the very fast synthesis of different medium molecular weight (FIG. 8a, b) and very high molecular weight PMA (FIG. 8b, c). This polymerization can be carried out in the presence or absence of CuX₂ (FIG. 8). Catalysis by Cu₂O, Cu₂S, Cu₂Se, and Cu₂Te/TREN in DMSO was demonstrated by the kinetic experiments. The resulting PMA contains two functional chain ends with different reactivity. This suggests new strategies for the synthesis of multifunctional block copolymers and other complex architectures.

LRP of MMA Initiated with 2,2-Dichloroacetophenone (DCAP) and Phenoxybenzene-4,4'-Disulfonylchloride (PDSC) Catalyzed by Cu(0)/PMDETA and bpy in Dipolar Aprotic Solvents.

Figure 9:
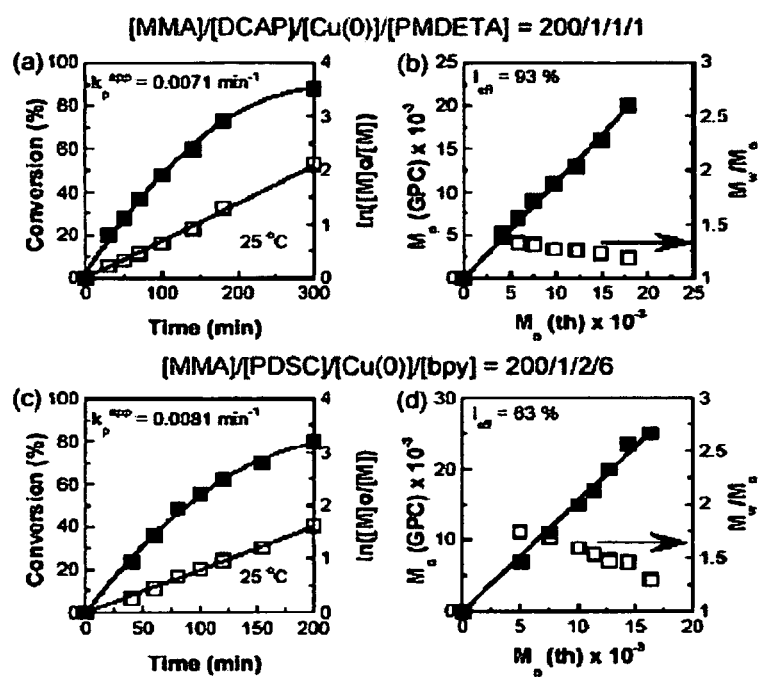
FIG. 9. Kinetic plots for the Cu(0) mediated living radical polymerization of MMA initiated with: a to b) 2,2-dichloroacetophenone (DCAP) (conditions: MMA=1 mL, DMSO=0.5 mL), $[MMA]_0$=6.2 mol/L, and $[MMA]_0/[DCAP]_0$=200) using PMDETA as a ligand; c) to d) phenoxybenzene-4,4'-disulfonylchloride (PDSC) (conditions.

Two examples of unoptimized kinetic experiments are presented in FIG. 9. The first one is initiated with DCAP and catalyzed by Cu(0)/PMDETA in Supporting Scheme SS2) and catalyzed with Cu(0)/bpy in NMP. Both experiments were performed at 25° C. Since sulfonyl halides are known to undergo side reactions in the presence of DMSO and of aliphatic N-containing ligands, the classic bpy ligand employed previously with sulfonyl halide initiators was used. These two examples demonstrate a dramatic acceleration by comparison with related experiments carried out in nonpolar solvents.

LRP of VC Initiated with CHBr₃ and Catalyzed with Cu(0), Cu₂O, Cu₂S, Cu₂Se, Cu2Te/TREN in DMSO.

Previously, we have reported the SET-DT-LRP of VC initiated with CHI₃ in H₂O at 25° C. catalyzed by the same catalytic systems. However, since CHI₃ is a good chain transfer agent and the polymerization mixture was heterogeneous, a two stage kinetic process leading to a limited VC conversion was observed. In addition, CHBr₃ would be a less reactive, more stable and less expensive initiator for the polymerization of VC. Since reactivity studies on MA have demonstrated little difference between the nature of X from the structure of R—X and its $k_{act}$, we decided to investigate reaction conditions for the polymerization of VC initiated with CHBr₃. Using Me₆-TREN as a ligand in conjunction with Cu(0) mediates the polymerization of VC only to low conversion. However, the replacement of Me₆-TREN with TREN in DMSO provided a rewarding result. FIG. 10 presents selected experiments catalyzed with different concentrations of Cu(0)/TREN and DMSO.

Without optimization, we can see that about 90% VC conversion can be reached in a very short period of time. The molar ratio [CHBr₃]₀/[Cu(0)]₀ can be reduced from 1/1 (FIG. 10a, b) to 1/0.5 (FIG. 10c, d) and to 1/0.1 (FIG. 10e, f) with higher rates than previously reported with CHI₃. Since the amount of DMSO used in these polymerizations is very small, at the end of the polymerization the reaction mixture contains the white solid PVC plasticized with some DMSO.

Therefore, purification of PVC requires only washing with H₂O or MeOH. The limited amount of Cu(0) powder required to mediate this polymerization suggests that Cu(0) wire is sufficient to promote it. Indeed, FIG. 11a,b demonstrates this concept (compare FIG. 10c,d with FIG. 11a,b). Higher molecular weight PVC can be obtained with higher [VC]₀/[CHBr₃]₀ ratios in the presence of Cu(0), Cu₂Te, Cu₂Se, Cu₂S, and Cu₂O. The resulting α,ω-dibromo (PVC) can be used as initiator for the synthesis of blockcopolymers and other complex architectures.

Mechanistic Considerations.

The experimental observation that in situ formed Cu(I)X undergo spontaneous disproportionation under the polymerization conditions and that most of these polymerizations do not require externally added deactivator such Cu(II)X₂ demonstrates that the active catalyst is the nascent Cu(0) molecular species (Scheme 1). When Cu₂Te, Cu₂Se, Cu₂S and Cu₂O are used as catalysts they are the initial electron-donor catalysts. The rather interesting question is: by what mechanism are the radicals formed under these conditions? Several experimental observations as well as literature data help to elaborate the most probable mechanistic hypothesis for the activation of the dormant species. On the one hand the $k_p^{app}$ during LRP of MA strongly depends on the concentration of DMSO used in the polymerization mixture (FIG. 3b). Increasing DMSO concentration leads to faster polymerization while maintaining the good control over molecular weight and molecular weight distribution. If the radicals would be formed through an inner-sphere homolytic atom-transfer process, like in the case of ATRA and ATRP than the polymerization rate and hence the $k_p^{app}$ would have to exhibit very little dependence on the polarity of the reaction medium. This is because the rate of reactions where radical intermediates are involved is not strongly dependent on the polarity of the medium. In principle the opposite effect should be observed: polymerization rate must decrease when the monomer, catalyst and initiator concentration decrease. This observation is an indication that the formation of radicals is occurring via a different mechanism. One option is that ionic intermediates are involved in the rate-limiting step of the radical formation. In this case the rate of radical generation must dependent strongly on the polarity of the reaction medium and this indeed was observed experimentally (FIG. 3b). The radicals are most likely generated through the decomposition of radical-anion intermediates that are initially formed via the SET reaction between Cu(0) species and the halogen containing substrates such as initiator and halogen terminated polymeric chain end. These considerations are supported by literature data that show that dipolar aprotic as well as protic solvents facilitate fast SET reactions between electron-donor including Cu(0) and various halogen containing compounds (including haloforms and tetrahalomethanes).

A series of Quantum Chemical calculations were also performed on model systems to verify which path best describes the experimental observations that the nature of the halogen does not affect the rate of polymerization of MA when Cu(0) catalyst is used under similar conditions. The results of these calculations are shown in Scheme 2.

Scheme 2. Relative C-X bond dissociation energies in methyl 2-halopropionates: homolytic bond dissociation (top diagram) and formation and decomposition of anion-radicals formed by set process (bottom diagram) calculated using: (U)B3LYP/6-31+G*//(U)B3LYP/6-31+G* (for Cl and Br Case) or (U)B3LYP/LACVP +*//(U)B3LYP/LACVP+* (for I Case) methods.

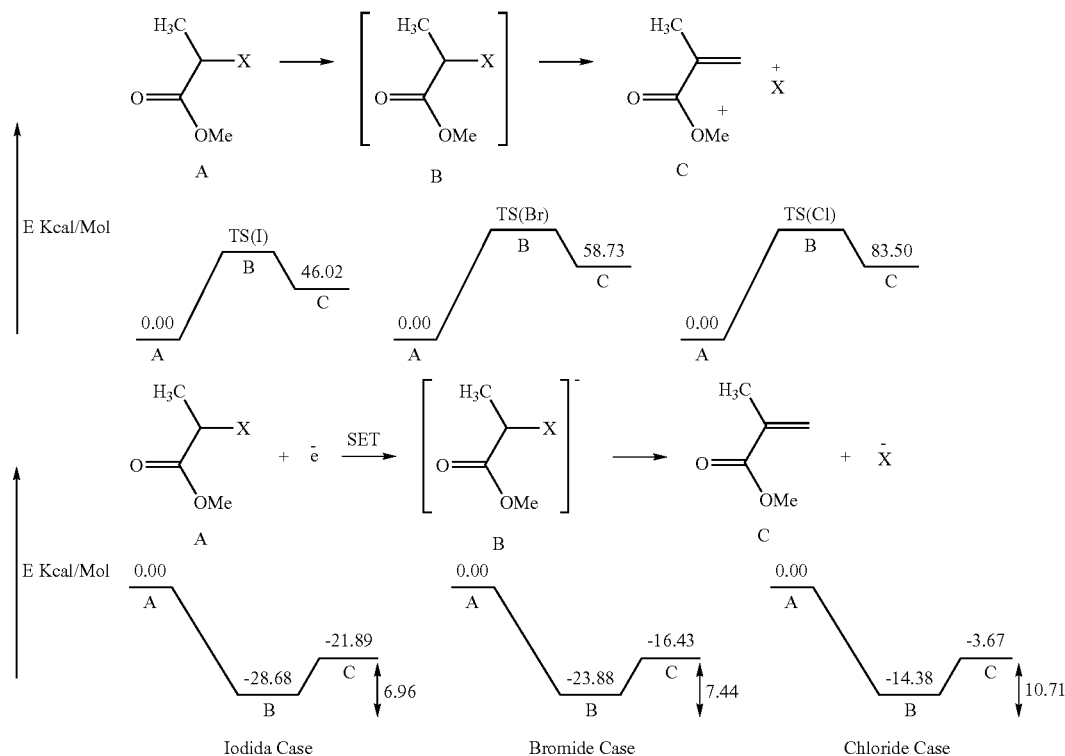

The homolytic C—X bond dissociation energy (BDE) in the initiators MCP (X=Cl), MBP (X=Br), and MIP (X=I) species appears to strongly depend on the nature of the halogen and usually increases in the following order: Cl>Br>I (Scheme 2, top diagram). The calculated BDE are in good agreement with previously calculated values obtained for the same methyl 2-halopropionate systems. The C—X bond dissociation energy depends very little on the nature of the halogen (X) if it is occurring through the decomposition of the radical-anion formed via a SET process (Scheme 2, bottom diagram). The generalized catalytic cycle of SET-LRP is depicted in the Scheme 3.

Scheme 3. Proposed catalytic cycle of SET-LRP mediated by Cu(0) species in polar media.

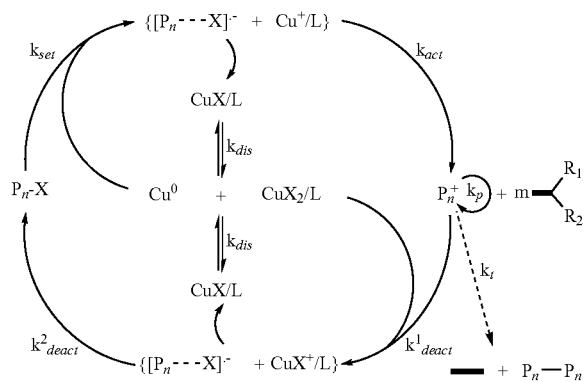

The reaction starts with SET reaction between Cu(0) species and the halogen containing substrate (initiator on halogen terminated polymeric chain end). Any polar solvent including DMSO facilitates the decrease of interaction between anion ($X^-$) and electrophilic radical ($R^.$) from the radical-anion pair. The radical anion cluster and Cu/L+ countercation must be in close proximity in the so called caged ion-pair thus further facilitating decomposition of radical-anion into the radical and the anion ($X^-$). The reaction between radical and deactivator CuX2/Ligand in polar media is a more complex process. One of the possible mechanisms may involve the transfer of the halide anion $X^-$ from the deactivator to the propagating macroradical $R^.$, leading to a similar ion-cage composed of radical anion $[R—X]^{.-}$ and CuX/L+ countercation. The mechanism depicted in the Scheme 3 is simplified in a way to understand the main chemical events, which might be involved in this catalytic process. The goal of this report is not to provide a complete mechanistic investigation of the SET-LRP process mediated by nascent Cu(0) species, but rather to develop the SET-LRP synthetic method and to compare it with that based on the inner-sphere process. More experimental and theoretical studies are necessary to elucidate the hypothetic mechanism outlined in Scheme 3. Investigations in this direction are in progress and will be reported in due time.

Nevertheless, the SET-LRP reported here, together with its mechanistic hypothesis, explains numerous literature examples in which an acceleration of the Cu(I)X-catalyzed LRP was observed in $H_2O$, alcohols, ethylene glycol, DMSO, DMF, and ionic liquids.

EXAMPLES

1. Materials

Methyl 2-bromopropionate (MBP) (98%), 2-bromopropionitrile (BPN) (97%), 2,2-dichloroacetophenone (DCAP) (99%), bromoform (98%), chloroform (99%), N,N,N',N',N''-pentamethyldiethylenetriamine (PMDETA) (99%), tris(2-aminoethyl)amine (TREN) (96%), polyethyleneimine (PEI, linear, Mn ca 423, b.p. 250° C.), dimethylsulfoxide (DMSO) (99%), N,Ndimethylformamide (DMF) (99%), 1-methyl-2-pyrrolidone (NMP) (95%), ethylene carbonate (98%), phenol (99+%), CuCl (98+%), CuI (98%), and Cu(0) powder (99%) were purchased from Aldrich and used as received. Iodoform (99+%), CuBr (98%), $CuBr_2$ (99+%), ethylene glycol (99+%), diethylene glycol (99%), triethylene glycol (99%), tetraethylene glycol (99.5%), 2-(2-ethoxyethoxy)ethanol (98+%), N,N-dimethylacetamide (DMAC) (99%), and glycerol (99+%) were purchased from Acros and used as received. $Cu_2O$, $Cu_2S$ (99.5%), $Cu_2Se$ (99.5%), and $Cu_2Te$ (99.5%) were purchased from Alfa Aesar and used as received. Methanol ($CH_3OH$) (ACS grade), acetonitrile ($CH_3CN$) (HPLC grade), and tetrahydrofuran (THF) (HPLC grade) were purchased from Fisher and used as received. $CuCl_2$ (98+%) was purchased from Fluka and used as received. 2,2'-Bipyridine (bpy) (99+%) was purchased from Lancaster and used as received. Ethanol (ACS grade) was purchased from Pharmco-AAPCR and used as received.

Methylacrylate (MA) (99%), methyl methacrylate (MMA) (99%), n-butyl acrylate (nBA) (99%), and tert-butyl acrylate (tBA) (99%) were purchased from Acros Organics. In order to remove the inhibitor, the monomers were passed through a basic $Al_2O_3$ chromatographic column (flash) just before use. Vinyl chloride (VC) (99%) was purchased from Aldrich.

Hexamethylated tris(2-aminoethyl)amine (Me6-TREN) was synthesized as described in the literature (Ciampolini, M.; Nardi, N. Inorg. Chem. 1966, 5, 41-44). The difunctional initiator phenoxybenzene-4,4'-disulfonylchloride (PDSC) was synthesized according to a literature procedure (Percec, V.; Kim, H.-J.; Barboiu, B. Macromolecules 1997, 30, 6702-6705). The 4-arm star multi-functional initiator pentaerythritol tetrakis(2-bromopropionate) (4BrPr) was synthesized according to the literature (Matyjaszewski, K.; Miller, P. J.; Pyun, J.; Kickelbick, G.; Diamanti, S. Macromolecules 1999, 32, 6526-6535). Also synthesized according to a literature procedure was the 8-arm star initiator 5,11,17,23,29,35,41,47-octa-tert-butyl-49,50,51,52,53,54,55,56-octakis-(2-bromopropionyloxy)calyx[8]arene (8BrPr) (Angot, S.; Murthy, K. S.; Taton, D.; Gnanou, Y. Macromolecules 2000, 33, 7261-7274). The ligand N-n-propyl-2-pyridyl-methanimine was synthesized via a procedure from the literature (Haddleton, D. M.; Jasieczek, C. B.; Hannon, M. J.; Shooter, A. J. Macromolecules 1997, 30, 2190-2193). N-chloro-2-pyrrolidinone (NCP) was synthesized according to a literature procedure (Curini, M.; Epifano, F.; Marcotullino, M. C.; Rosati, O.; Tsadjout, A. Synlett 2000, 813-814).

2. Techniques

500 MHz 1H-NMR spectra were recorded on a Bruker DRX500 machine at 20° C. in $CDCl_3$ or THF-d8, with or without tetramethylsilane (TMS) as an internal standard. Gel permeation chromatographic (GPC) analyses of the polymer samples were done on a Perkin-Elmer Series 10 high performance liquid chromatograph, equipped with an LC-100 column oven (40° C.), a Nelson Analytical 900 Series integrator data station, a Perkin-Elmer 785A UV-VIS detector (254 nm), a Varian star 4090 refractive index (RI) detector and two AM gel (500 Å, 5 μm and 104 Å, 5 μm for low molecular weight samples) or three AM gel (500 Å, 10 μm; 104 Å, 5 μm; and 105 Å, 10 μm for high molecular weight samples) columns. THF (Fisher, HPLC grade) was used as eluent at a flow rate of 1 mL/min. The number (Mn) and weight average (Mw) molecular weights of the PMA and PMMA samples were determined with PMMA standards purchased from American Polymer Standards. The Mn and Mw of the PVC samples were determined with polystyrene (PS) standards purchased from American Polymer Standards or Pressure Chemical. The molecular weight values for PVC were corrected with Universal Calibration with the following Mark-Houwink parameters for PVC: $K=1.50\times10^{-2}$ mL/g and a=0.77.6 The UVVIS spectra were recorded on a Shimadzu UV-1601 spectrophotometer.

3. UV Spectroscopic Analyses of Cu(I)X Disproportionation

Typical UV-VIS Spectroscopic Analysis of CuX/Ligand and $CuX_2$/Ligand Complexes in Different Solvents. CuBr (2.3 mg, 0.01 mmol) or $CuBr_2$ (2.3 mg, 0.01 mmol) was placed in a quartz UV-VIS cell (1 mm path length) and purged with argon. To the cell was added 3 mL of a deoxygenated stock solution of Me6-TREN in DMSO (0.76 mg/mL, 0.0033 mmol/mL). The cell was sealed under argon via a rubber septum with a screw cap. After vigorous shaking, the cell was placed in the UV-VIS spectrometer for measurement. In the case of the CuBr/$Me_6$-TREN complex, the UV-VIS spectra were taken after approximately 10 min to allow the Cu(0) obtained by disproportionation to precipitate in the bottom of the quartz cell. The absorbance was recorded in the 200-1100 nm range.

4. Synthesis

A. Typical Procedure for Cu(0) Catalyzed LRP of MA.

The MA monomer (2 mL, 22.2 mmol), DMSO (1 mL), methyl 2-bromopropionate initiator (16.7 mg, 0.1 mmol), $Me_6$-TREN (23 mg, 0.1 mmol), and Cu(0) powder (6.3 mg, 0.1 mmol) were added to a 25 mL Schlenk tube in the following order: Cu(0), MA, ligand, DMSO, initiator. The Schlenk tube containing the reaction mixture was then frozen in a dry ice/acetone bath at −78° C. and deoxygenated with three consecutive standard freeze-pump-thaw cycles. Subsequently, the Schlenk tube with the reaction mixture was placed in an oil bath (25±0.1° C.) with stirring. The side arm of the Schlenk tube was purged with argon and the polymerization reaction was sampled with an airtight syringe. The monomer conversion was determined by 1H-NMR spectroscopy, whereas the Mn and Mw/Mn values were determined by GPC with PMMA standards (conversion: 98% (50 min), Mn GPC=19,100, Mw/Mn=1.21).

B. Typical Procedure for Cu(0) Catalyzed LRP of MMA.

The monomer (MMA) (2 mL, 18.8 mmol), DMSO (1 mL), initiator (DCAP) (19.0 mg, 0.1 mmol), Cu(0) powder (6.3 mg, 0.1 mmol), and PMDETA ligand (17 mg, 0.1 mmol) were added to a 25 mL Schlenk tube in the following order: Cu(0), monomer, ligand, DMSO, initiator. The Schlenk tube was frozen in dry ice/acetone bath at −78° C. and deoxygenated with three standard freeze-pump-thaw cycles. After the final thaw, the Schlenk tube with containing the reaction mixture was placed in an oil bath (25±0.1° C.) and stirred. The side arm of the Schlenk tube was purged with argon and the polymerization reaction was periodically sampled with an airtight syringe. The monomer conversion was determined by 1H-NMR spectroscopy and the Mn and Mw/Mn values were determined by GPC with PMMA standards (conversion: 84% (300 min), Mn GPC=20,000, Mw/Mn=1.19).

C. Typical Procedure for Cu(0) Catalyzed LRP of VC.

In a typical experiment, a 50 mL Ace Glass 8648 #15 Ace-thred pressure tube equipped with bushing and a plunger valve was charged with 2 mL of a previously degassed stock solution of $CHBr_3$ in DMSO (126 mg, 0.5 mmol CHBr3 in 10 mL DMSO). Cu(0) (6.3 mg, 0.1 mmol) and TREN (14.2 mg, 0.1 mmol) were then added to the tube. The tube was filled with argon, closed, and frozen in acetone/dry ice bath at −78° C. Then, precondensed VC (approximately 3 mL, 43 mmol) was added to the tube. The tube was closed and degassed through the plunger valve by applying vacuum and then filling the tube with argon 5 times. The valve was closed and the tube with reaction mixture was stirred in a water bath at 25±0.1° C. After appropriate reaction time, the tube was removed from the water bath and opened slowly to allow any unreacted VC to evaporate. The conversion of VC was determined gravimetrically. The reaction mixture was diluted with a small amount of THF (3 mL) and the mixture was slowly poured into MeOH (150-200 mL) with stirring. An aliquot from the reaction mixture was further diluted with THF and filtered through a 0.5 μm membrane filter. The filtrate was analyzed by GPC. The kinetic data was accumulated from individual experiments since sampling of the reaction was not possible (conversion: 85% (180 min), MnGPC=31,600, Mw/Mn=1.53).

D. Typical Procedure for Synthesis of Low Molecular Weight PMA.

In a typical polymerization experiment, catalyst Cu(0) (0.63 mg. 0.01 mmol) (or 0.01 mmol of any $Cu_2X$ compound, where X=O, S, Se or Te), monomer MA (2 mL, 22.2 mmol), DMSO additive (1 mL), $M_6$Tren Ligand (2.3 mg, 0.01 mmol) where charged in a 25 mL schlenk tube. The initiator $CHBr_3$ (25.2 mg, 0.1 mmol) was added last to the polymerization mixture. The Schlenk tube was closed and the places in a dry ice/acetone bath (78° C.) in order to freeze the reaction mixture. The polymerization mixture was degassed through freeze-thaw-freeze cycles, filled with Ar gas and placed in an oil bath (25±0.1° C.). The reaction mixture becomes slightly greenish after approximately 10-15 min. The polymerization stopped in 50 min. after reaction started. The Schlenk tube was opened and small aliquot of the polymerization mixture was dissolved in $CDCl_3$ and the conversion of MA was measured by 1H NMR. Another part of the aliquot from the reaction mixture was diluted with THF, filtered through 0.5-μm membrane filter and the molecular weight of the PMA was analyzed by GPC against PMMA standards. Conversion of MA 92% (90 min). MnGPC=17,800, Mw/Mn=1.18. The rest of the reaction mixture was dissolved in 10 mL THF and the PMA was precipitated (gummy mass) in 120 mL Methanol under stirring. The methanol was removed by decantation and the resulting gummy mass was washed again with MeOH to remove residual monomer and additive (2×50 mL). Methanol was removed again by decantation and the final colorless PMA polymer was dried under vacuum until constant weight was reached. Note: it is remarkable that regardless the catalyst used the resulting PMA is colorless product after precipitation in MeOH.

E. Typical Procedure for Synthesis of Ultrahigh Molecular Weight PMA.

In a typical experiment, MA monomer (2 mL, 22.2 mmol), DMSO additive (1.6 mL) where charged in a 25 mL schlenk tube. Because of very high DP used ($[MA]_0/[MPB]_0$ 11,100) it was only possible to add catalyst (Cu(0)), ligand ($M_6$Tren) and initiator (MPB) to the polymerization mixture using the stock solution/suspension. The Cu(0) catalyst (6.3 mg, 0.1 mmol) and the $M_6$Tren ligand (23 mg, 0.1 mmol) were putted in degassed 10 mL DMSO. The vial containing above mixture were shaken intensively and 0.2 mL of these stock suspension containing Cu (0) catalyst (0.126 mg, 0.002 mmol) and $M_6$Tren ligand (0.46 mg, 0.002 mmol) were taken out and added to a polymerization mixture. The stock solution of the initiator (MPB) was introduced in a similar manner. The initiator MPB (25.2 mg, 0.1 mmol) was dissolved in 10 mL degassed DMSO and 0.2 mL of this solution containing MPB initiator (0.5 mg, 0.0019 mmol) was added to the polymerization mixture. The schlenk tube was closed and the polymerization mixture was degassed using standard freeze-taw-freeze cycles. The shclenk tube was backfilled with Ar gas and places in an oil bath (25±0.1° C.). The reaction was stopped in 550 min. The reaction mixture remained colorless even at the end of the reaction. The conversion and Mn and Mw/Mn were determined in a similar manner as described previously. Conversion of MA 96% (550 min), MnGPC=935, 000, Mw/Mn=1.17. the rest of the polymerization mixture was dissolved in 50 mL THF and the PMA was isolated in a similar manner as described in previous section.

F. Typical Procedure for Synthesis of 4 Armed Star PMA.

In a typical polymerization experiment, Cu(0) (6.3 mg. 0.1 mmol), MA (1 mL, 11.1 mmol), DMSO (0.5 mL), and $Me_6$-TREN (2.3 mg, 0.1 mmol) were charged in a 25 mL Schlenk tube. The initiator 4BrPr (16.9 mg, 0.025 mmol) was added to the polymerization mixture last. The Schlenk tube was closed and placed in a dry ice/acetone bath (−78° C.) in order to freeze the reaction mixture. The polymerization mixture was degassed through freeze-pump-thaw cycles, filled with Ar gas and placed in an oil bath (25±0.1° C.). The reaction mixture becomes greenish after approximately 10 min. The polymerization completed in 35 min. The Schlenk tube was opened, a small aliquot of the polymerization mixture was dissolved in $CDCl_3$, and the conversion of MA was measured by $^1$H NMR. Another aliquot from the reaction mixture was diluted with THF, filtered through a 0.5-μm membrane filter, and the molecular weight of the PMA was analyzed by GPC against PMMA standards. Typical results were as follows: conversion of MA=97% (35 min), MnGPC=39,300, Mw/Mn=1.21. The remainder of the reaction mixture was dissolved in 10 mL THF and the resultant 4-armed PMA was precipitated (gummy mass) in 120 mL methanol with stirring. The methanol was removed by decantation and the gummy mass was washed again with MeOH to remove residual monomer and DMSO (2×50 mL). Methanol was removed again by decantation and the final colorless PMA was dried under vacuum until constant weight was reached. Note: it is remarkable that, regardless of the catalyst, the resulting 4-armed star PMA is colorless after precipitation in MeOH.

G. Typical Procedure for Synthesis of PMMA.

In a typical polymerization experiment, Cu(0) (6.3 mg. 0.1 mmol), MMA (2 mL, 18.8 mmol), DMSO (1 mL) and PMDETA (17 mg, 0.1 mmol) were charged in a 25 mL Schlenk tube. The initiator DCAP (18.9 mg, 0.1 mmol) was added to the polymerization mixture last. The Schlenk tube was closed and then placed in a dry ice/acetone bath (−78° C.). The polymerization mixture was degassed through three freeze-pump-thaw cycles, filled with Ar gas, and placed in an oil bath (25±0.1° C.). The polymerization was stopped after 330 min. The Schlenk tube was opened and a small aliquot of the polymerization mixture was dissolved in $CDCl_3$. The conversion of MMA was measured by 1H NMR. Another aliquot from the reaction mixture was diluted with THF, filtered through a 0.5-μm membrane filter, and the molecular weight of the PMMA was analyzed by GPC against PMMA standards. Typical results were as follows: conversion of MMA=83% (330 min), MnGPC=20,000, Mw/Mn=1.19. The rest of mixture was dissolved in 10 mL THF and the PMMA was precipitated (white powder) in 120 mL methanol with stirring. The mixture was filtered and the resulting PMMA was washed with MeOH (50 mL), distilled water (50 mL), and again with MeOH (50 mL), and then dried under vacuum until a constant weight was obtained. The resulting PMMA is a white powder. No green color associated with Cu(II) species is visually detectable.

5. Quantum Chemical Calculations

All of the calculations were performed on a PC using Spartan' 04 Quantum Mechanics Program: (PC/X86). The geometry optimizations were performed using B3LYP functional. The 6–31+G* was used for all C, H, O, Cl, Br, S, and Se atoms. Since I and Te atoms are not included in the standard 6–31+G* basis set, they were described with the LACVP+* basis set. The systems containing unpaired electrons were optimized with the spin unrestricted formalism. The spin contamination was found to be negligible in these cases, since the value of <S^2> operator was always found to cluster around 0.75.

The most stable conformation of MCP, MBP, MIP and corresponding free radicals has been reported to have the value of the central C—O—C(O)—C dihedral angle close to 180°.9 The conformational analysis of MCP, MBP, MIP neutral molecules, corresponding radicals and radical anions performed at PM3 level indeed revealed that the most stable conformations of the above species have a central C—O—C(O)—C dihedral angle close to 180°. The geometries of these species were preliminary optimized at the PM3 level, followed by HF-DFT optimization at (U)B3LYP/6–31+G* or (U)B3LYP/LACVP+* level of theory. The C—X (X=Cl, Br, I) homolytic bond dissociation energies (BDE) for MCP, MBP, and MIP were calculated using the formula: BDE= $[E_{abs}$(radical)+$E_{abs}$(atom)]–$E_{abs}$(neutral molecule). Radical-anions were optimized as follows: Neutral Molecule+1 electron (charge=–1, spin multiplicity=2). The C—X— bond heterolytic dissociation energy in radical anions were calculated using the formula: E=[$E_{abs}$(radical)+$E_{abs}$(X—)]–$E_{abs}$ (neutral molecule). The homolytic BDE, the energy for radical-anion formation and energy of the radical—anion decomposition into radicals and anion (X—) were recalculated in kcal/mol (1 hartree=627.509 kcal/mol).

All geometry optimizations were performed without symmetry constraints (C1 symmetry) in order to ensure that the resultant geometry is not a local minimum. The frequency calculations were performed to verify that the optimized structures were the energy minima on the potential energy surface (no imaginary frequency). The absolute energies of the calculated species are reported without corrections for zero point vibrational energy. The energy of EHOMO for Cu(0), $Cu_2O$, $Cu_2S$, $Cu_2Se$, $Cu_2Te$, CuCl, CuBr and CuI were calculated at (U)HF/6–31+G* (or (U)HF/LACVP+* for I and Te case) level on the (U)B3LYP/6–31+G* (or (U)B3LYP/LACVP+* for I and Te case) optimized geometries (except Cu(0)).

A list of HF-DFT optimized geometries (Cartesian Coordinates) and absolute energies (in a. u.) for all calculated species follow.

$Cu_2Te$
Eabs=–400.4224223    a.u.    (B3LYP/LACVP*//B3LYP/LACVP*)
Point Group=C1
Cartesian Coordinates (Angstroms):

| 1 Te | 0.0000000 | 0.0000000 | 1.3604113 |
|---|---|---|---|
| 2 Cu | –1.3361532 | 0.0000000 | –0.6802057 |
| 3 Cu | 1.3361532 | 0.0000000 | –0.6802057 |

$Cu_2Se$
Eabs=–5681.8411508    a.u.    (B3LYP/6-31G*//B3LYP/6-31G*)
Point Group=C1
Cartesian Coordinates (Angstroms):

| 1 Se | 0.0000000 | 0.0000000 | 1.2309346 |
|---|---|---|---|
| 2 Cu | –1.1088916 | 0.0000000 | –0.6154673 |
| 3 Cu | 1.1088916 | 0.0000000 | –0.6154673 |

$Cu_2S$
Eabs=–3678.7149250    au.    (B3LYP/6-31G*//B3LYP/6-31G*)
Point Group=C1
Cartesian Coordinates:

| 1 S | 0.0000000 | 0.0000000 | 1.1486590 |
|---|---|---|---|
| 2 Cu | –1.1099826 | 0.0000000 | –0.5743295 |
| 3 Cu | 1.1099826 | 0.0000000 | –0.5743295 |

Cu(0)
Eabs=–1640.1741763 a.u. (UB3LYP/6-31G*)
$Cu_2O$
Eabs=–3355.7003431    au.    (B3LYP/6-31G*//B3LYP/6-31G*)
Point Group=C1
Cartesian Coordinates (Angstroms):

| 1 O | 0.0000000 | 0.0000000 | 0.8584350 |
|---|---|---|---|
| 2 Cu | –1.1272959 | 0.0000000 | –0.4292175 |
| 3 Cu | 1.1272959 | 0.0000000 | –0.4292175 |

CuI
Eabs=–207.5850009    a.u.    (B3LYP/LACVP*//B3LYP/LACVP*)
Point Group=C1
Cartesian Coordinates (Angstroms):

| 1 Cu | 0.0000000 | 0.0000000 | –1.2048220 |
|---|---|---|---|
| 2 I | 0.0000000 | 0.0000000 | 1.2048220 |

CuBr
Eabs=−4214.1464220 a.u. (B3LYP/6-31G*//B3LYP/6-31G*)
Point Group=C1
Cartesian Coordinates (Angstroms):

| | | | | |
|---|---|---|---|---|
| 1 | Cu | 0.0000000 | 0.0000000 | 1.0588115 |
| 2 | Br | 0.0000000 | 0.0000000 | −1.0588115 |

CuCl
Eabs=−2100.4520280 a.u. (B3LYP/6-31G*//B3LYP/6-31G*)
Point Group=C1
Cartesian Coordinates (Angstroms):

| | | | | |
|---|---|---|---|---|
| 1 | Cu | 0.0000000 | 0.0000000 | 1.0041944 |
| 2 | Cl | 0.0000000 | 0.0000000 | −1.0041944 |

Methyl 2-Cloropropionate (MCP), (Neutral Molecule)
Eabs=−767.3077339 a.u (B3LYP/6-31+G*//B3LYP/6-31+G*)
Point Group=C1
Cartesian Coordinates (Angstroms):

| | | | | |
|---|---|---|---|---|
| 1 | C | −0.2528860 | 0.0164349 | −0.2393631 |
| 2 | O | −0.3902800 | −0.4049968 | −1.3673965 |
| 3 | O | −1.2665765 | 0.2500980 | 0.6130306 |
| 4 | C | −2.5940996 | 0.0283209 | 0.0941380 |
| 5 | H | −2.7761784 | 0.6820409 | −0.7628360 |
| 6 | H | −2.7119174 | −1.0148011 | −0.2108474 |
| 7 | C | 1.0913757 | 0.3450416 | 0.4072165 |
| 8 | Cl | 1.3909227 | 2.1340745 | 0.1396748 |
| 9 | C | 2.2327492 | −0.4761918 | −0.1663920 |
| 10 | H | −3.2671891 | 0.2708147 | 0.9164342 |
| 11 | H | 2.0597560 | −1.5387426 | 0.0454130 |
| 12 | H | 2.2963774 | −0.3487501 | −1.2497452 |
| 13 | H | 3.1806992 | −0.1794834 | 0.2911155 |
| 14 | H | 1.0072468 | 0.2361405 | 1.4895578 |

Methyl 2-Cloropropionate (MCP), (Radical Anion)
Eabs=−767.3493687 a.u (UB3LYP/6-31+G*//UB3LYP/6-31+G*)
Point Group=C1
Cartesian Coordinates (Angstroms):

| | | | | |
|---|---|---|---|---|
| 1 | C | −0.2596536 | 0.3216921 | −0.0344609 |
| 2 | O | −0.4259519 | 1.3156674 | 0.6809210 |
| 3 | O | −1.3408344 | −0.3570892 | −0.5683938 |
| 4 | C | −2.6137240 | 0.0512950 | −0.0830770 |
| 5 | H | −2.6849206 | −0.1022534 | 1.0001366 |
| 6 | H | −2.8062079 | 1.1089711 | −0.2999819 |
| 7 | C | 0.9910290 | −0.2479644 | −0.4333008 |
| 8 | Cl | 1.3718341 | −2.5212078 | 1.3895061 |
| 9 | H | −3.3430919 | −0.5797527 | −0.5987924 |
| 10 | C | 2.2824467 | 0.3989025 | −0.0624012 |
| 11 | H | 3.0897515 | −0.3389336 | −0.0719085 |
| 12 | H | 0.9719558 | −1.1003178 | −1.0996121 |
| 13 | H | 2.5460421 | 1.2164852 | −0.7591671 |
| 14 | H | 2.2213251 | 0.8345054 | 0.9405319 |

Methyl 2-Bromopropionate (MBP), (Neutral Molecule)
Eabs=−2880.9936134 a.u. (B3LYP/6-31+G*//B3LYP/6-31+G*)
Point Group=C1
Cartesian Coordinates (Angstroms):

| | | | | |
|---|---|---|---|---|
| 1 | C | 0.2501356 | 0.1314331 | −0.2020290 |
| 2 | O | 0.3537218 | 1.0925393 | −0.9340686 |
| 3 | O | 1.2876156 | −0.4746333 | 0.4040596 |
| 4 | C | 2.5964048 | 0.0423872 | 0.0877390 |
| 5 | H | 2.7809485 | −0.0323038 | −0.9870486 |
| 6 | H | 2.6758969 | 1.0870064 | 0.3999290 |
| 7 | C | −1.0660638 | −0.5340544 | 0.1719627 |
| 8 | C | −2.2538831 | 0.4074550 | 0.0956128 |
| 9 | H | 3.2936361 | −0.5830393 | 0.6451142 |
| 10 | H | −2.1231335 | 1.2135731 | 0.8296322 |
| 11 | H | −2.3330562 | 0.8605132 | −0.8953942 |
| 12 | H | −3.1804659 | −0.1250454 | 0.3267802 |
| 13 | H | −0.9719440 | −1.0150002 | 1.1453716 |
| 14 | Br | −1.3098129 | −2.0708310 | −1.0876609 |

Methyl 2-Bromopropionate (MBP), (Radical Anion)
Eabs=−2881.0452479 a.u. (UB3LYP/6-31+G*//UB3LYP/6-31+G*)
Point Group=C1
Cartesian Coordinates (Angstroms):

| | | | | |
|---|---|---|---|---|
| 1 | C | −0.2562378 | −0.3283228 | −0.0799036 |
| 2 | O | −0.4237346 | −0.9996960 | −1.1035036 |
| 3 | O | −1.3336640 | 0.1340329 | 0.6509669 |
| 4 | C | −2.6032115 | −0.0273683 | 0.0290901 |
| 5 | H | −2.6411375 | 0.5181498 | −0.9207688 |
| 6 | H | −2.8247506 | −1.0840299 | −0.1628807 |
| 7 | C | 0.9970930 | 0.0447094 | 0.5045959 |
| 8 | H | −3.3306856 | 0.3915068 | 0.7299249 |
| 9 | C | 2.2860762 | −0.4582417 | −0.0528649 |
| 10 | H | 3.0836895 | 0.2744189 | 0.1057442 |
| 11 | H | 0.9783459 | 0.6021987 | 1.4326197 |
| 12 | H | 2.5932826 | −1.4066337 | 0.4259754 |
| 13 | H | 2.1928995 | −0.6499085 | −1.1264637 |
| 14 | Br | 1.2820350 | 2.9891842 | −0.4325315 |

Methyl 2-Iodopropionate (MIP), (Radical Anion)
Eabs=−318.5592710 a.u. (UB3LYP/LACVP+*//UB3LYP/LACVP+*)
Point Group=C1
Cartesian Coordinates (Angstroms):

| | | | | |
|---|---|---|---|---|
| 1 | C | −0.2743473 | 0.3345543 | 0.0592728 |
| 2 | O | −0.4547787 | 1.1139890 | 0.9999789 |
| 3 | O | −1.3386066 | −0.2302025 | −0.6113694 |
| 4 | C | −2.6201452 | −0.0050643 | −0.0378573 |
| 5 | H | −2.8690668 | 1.0638658 | −0.0243288 |
| 6 | H | −2.6635193 | −0.3902748 | 0.9919483 |
| 7 | C | 0.9868803 | −0.0736799 | −0.4846061 |
| 8 | H | −3.3246787 | −0.5523027 | −0.6723511 |
| 9 | H | 0.9833672 | −0.7402158 | −1.3388708 |
| 10 | I | 1.5425497 | −3.1713702 | 0.7354062 |
| 11 | C | 2.2592081 | 0.5371198 | 0.0002307 |
| 12 | H | 2.4351147 | 1.5254234 | −0.4617545 |
| 13 | H | 2.2301611 | 0.6947642 | 1.0815083 |
| 14 | H | 3.1078617 | −0.1066063 | −0.2372072 |

Methyl 2-Iodopropionate (MIP), (Radical Anion)
$E_{abs}$=−318.5592710 a.u. (UB3LYP/LACVP+*//UB3LYP/LACVP+*)
Point Group=C1
Cartesian Coordinates (Angstroms):

| 1 | C | −0.2743473 | 0.3345543 | 0.0592728 |
|---|---|---|---|---|
| 2 | O | −0.4547787 | 1.1139890 | 0.9999789 |
| 3 | O | −1.3386066 | −0.2302025 | −0.6113694 |
| 4 | C | −2.6201452 | −0.0050643 | −0.0378573 |
| 5 | H | −2.8690668 | 1.0638658 | −0.0243288 |
| 6 | H | −2.6635193 | −0.3902748 | 0.9919483 |
| 7 | C | 0.9868803 | −0.0736799 | −0.4846061 |
| 8 | H | −3.3246787 | −0.5523027 | −0.6723511 |
| 9 | H | 0.9833672 | −0.7402158 | −1.3388708 |
| 10 | I | 1.5425497 | −3.1713702 | 0.7354062 |
| 11 | C | 2.2592081 | 0.5371198 | 0.0002307 |
| 12 | H | 2.4351147 | 1.5254234 | −0.4617545 |
| 13 | H | 2.2301611 | 0.6947642 | 1.0815083 |
| 14 | H | 3.1078617 | −0.1066063 | −0.2372072 |

Methyl 2-Propionate (MIP), (Radical)
$E_{abs}$=−307.0628099 a.u. (UB3LYP/6-31+G*//UB3LYP/6-31+G*)
Point Group=C1
Cartesian Coordinates (Angstroms):

| 1 | C | 0.1686850 | −0.1624271 | 0.0376287 |
|---|---|---|---|---|
| 2 | O | 0.2825485 | −1.3563179 | 0.2963209 |
| 3 | O | 1.2399390 | 0.6673946 | −0.1158377 |
| 4 | C | 2.5290542 | 0.0560297 | 0.0452454 |
| 5 | H | 3.2512155 | 0.8597245 | −0.1040666 |
| 6 | H | 2.6293930 | −0.3711565 | 1.0474913 |
| 7 | C | −1.0861288 | 0.5408380 | −0.1418041 |
| 8 | C | −2.3961650 | −0.1482195 | −0.0215786 |
| 9 | H | 2.6740194 | −0.7349123 | −0.6965963 |
| 10 | H | −2.9783913 | −0.0525034 | −0.9508694 |
| 11 | H | −2.2628166 | −1.2092980 | 0.2039246 |
| 12 | H | −3.0101593 | 0.3086110 | 0.7696617 |
| 13 | H | −1.0411935 | 1.6022370 | −0.3695199 |

| Cl | (Atom) | $E_{abs}$ = −460.1382897 a.u. (UB3LYP/6-31+G*) |
|---|---|---|
| Cl− | (Anion) | $E_{abs}$ = −460.2747235 a.u. (B3LYP/6-31+G*) |
| Br | (Atom) | $E_{abs}$ = −2573.8406396 a.u. (UB3LYP/6-31+G*) |
| Br− | (Anion) | $E_{abs}$ = −2573.9722001 a.u. (B3LYP/6-31+G*) |
| I | (Atom) | $E_{abs}$ = −11.3649187 a.u. (UB3LYP/LACVP+*) |
| I− | (Anion) | $E_{abs}$ = −11.4878954 a.u. (B3LYP/LACVP+*) |

6. Chain End Analysis of Poly(methyl)acrylates (PMA) Synthesized by Cu(0)-Mediated SET-LRP of MA Initiated with Haloforms The $^1$H NMR (500 MHz) spectra of PMA prepared by SET-LRP of MA initiated with haloform initiators (CHX$_3$, X=Cl, Br, I) and catalyzed either by Cu(0)/Me$_6$-TREN or Cu(0)/TREN (with or without CuX$_2$ deactivator) reveal the signals of the protons of the main-chain (methyne and methylene) are present in the region 1.31-2.52 ppm. The signal of OCH$_3$ side group appears at 3.60 ppm. Of special interest are the signals associated with the —CH$_2$—CHXC(O)OMe (X=Cl, Br, and I) chain ends and the initiator fragments —CHX$_2$ and —CHX— (X=Cl, Br, I). It is interesting to note that, in the case of CHCl$_3$ and CHBr$_3$ initiated SET-LRP of MA, the resulting polymers contain only —CHCl$_2$ and —CHBr$_2$ (signals at 5.65 and 5.60 ppm, correspondingly) fragments from the haloform initiators. The signals from the protons attached to the —HC—Cl and —HC—Br chain ends (—CH$_2$—CHXC(O)OMe end groups) are observed at 4.19 and 4.15 ppm, correspondingly. The integral ratio of —CHX and —CH$_2$—CHXC(O)OMe (X=Cl, Br) signals is 1:1 and is the same for PMA samples isolated at low and high conversion of MA. The latter observation demonstrates that CHCl$_3$ and CHBr$_3$ compounds act as monofunctional initiators in these polymerizations. The comparison of the $^1$H NMR spectra of PMA obtained using two different catalysts (Cu(0)/Mes-TREN and Cu(0)/TREN/CuBr$_2$) demonstrates that these two catalysts give the same chain end functionality in the resulting PMA.

In the case of CHI$_3$ initiator, the structure and chain end functionality of the PMA is a function of the conversion of MA. At low conversion, the PMA obtained is mostly growing in one direction (the signal at 4.97 ppm belongs to the— initiator fragment —CHI$_2$ and the signal at 4.32 ppm is attributed to the terminal methyne proton —CH$_2$—CHIC(O)OMe). The ratio of the integral of the signals observed at 4.32 and 4.97 ppm is 1:1 for the PMA polymers obtained at low conversion of MA. However, at high conversion, the intensity of —CHI$_2$ signal (4.97 ppm) decreases by comparison with the —CH$_2$—CHIC(O)OMe group methyne signal. This means that, during polymerization, the PMA starts to grow in two directions. Unfortunately the signal of —CHI— proton, which should appear at around 2.1-2.2 ppm, is hidden inside the PMA main-chain proton signals. The $^1$H NMR spectra of the PMA obtained during SET-LRP of MA initiated with CHI$_3$ and catalyzed by Cu(0)/Me$_6$-TREN or Cu(0)/TREN catalyst are almost identical, thus demonstrating that the chain end functionality of the resulting PMA does not depend on the catalyst structure.

$^1$H NMR (500 MHz) spectra of poly-t-BuA (FIG. 12) obtained during LRP of t-BuA initiated with the monofunctional MPB initiator and catalyzed by Cu(0)/Me$_6$-TREN catalyst in DMF show signals at 1.08-1.13 ppm belonging to the CH$_3$— group from MPB initiator (adjacent to the —CH group). The signal at 3.62 ppm belongs to the OMe group from the MPB initiator. The multiplet in 4.04-4.10 ppm region belongs to the terminal —CH$_2$—CHBrC(O)O-t-Bu methyne proton signal. In all cases the NMR and GPC determined molecular weights are in good agreement, which further supports the correctness of the assignment of the $^1$H NMR spectra of PMA obtained from SET-LRP of MA initiated with haloforms.

7. Structural Analysis of Poly(t-butyl acrylate) and Poly(n-butyl acrylate)

Structural Analysis of Poly(t-butyl acrylate) and Poly(n-butyl acrylate) by g HSQC and g HMBC. g-HSQC and g-HMBC NMR spectra of low molecular weight poly(t-butyl acrylate) and poly(n-butyl acrylate) recorded on a 600 MHz NMR spectrometer show the detailed microstructure of these two polymers. gHSQC spectra of both samples show multiple resolved resonances in $\delta_H$=1.3-2.0 ppm and $\delta_C$=34.0-38.0 ppm range for main chain CH$_2$ groups. Resonances from tetrad configurational structure (i.e. mmm, mrm, mmr, mrr, rrr, rmr) are well resolved along with many CH$_2$ resonances from terminal groups. These resonance patterns are consistent with a higher syndiotactic content of the poly(t-butyl acrylate) and highly atactic nature of poly(n-butyl acrylate). This result is also well complemented by the splitting pattern of main chain CH resonances: $\delta_H$=2.1-2.4 ppm and $\delta_C$=40.0-43.0 ppm. Previous NMR studies of these classes of polymers show that branches formed by intra- and intermolecular chain transfer reactions result in the formation of quaternary carbons at the branching point. A quaternary carbon at the branching point would show resonance in the 47.0-48.5 ppm region in the $^{13}$C NMR spectrum. However, in these samples, we failed to detect any quaternary carbons in this region from the g-HMBC NMR spectrum. Also, the g-HMBC would show two bond correlations to protons of the CH$_2$ and CH groups from the branched quaternary carbon. Failure to detect any such correlations (along with any detectable signal in $^{13}$C NMR spectrum) indicates the very low probability of a chain transfer reaction during this polymerization process. This result confirms that the polymers obtained at room temperature are mostly linear chains and, even if there are branched structures, they exist in such a small concentration that they are undetectable by multi-dimensional NMR spectroscopy.

What is claimed:

1. A method of polymerizing an alkene monomer to produce a polymer, the method comprising contacting said monomer with:
a catalyst that is Cu(0), Cu$_2$Te, CuSe, Cu$_2$S, Cu$_2$O, or a combination thereof;
an initiator that is one or more of sulfonyl halides, nitrogen halides or compounds of the formula R—X, R'C(=O) OR", or R'—CN, where X is a halogen—and R is C$_1$-C$_6$ alky, R' is a halogen-substituted C$_1$-C$_6$ alkyl, and R" is a C$_1$-C$_6$ alkyl; and
a component comprising a solvent and optional nitrogen-containing ligand, where the combination of the component and monomer is capable of diproportionating Cu(I)X into Cu(0) and Cu(II)X$_2$ where X is Cl, Br, or I.

2. The method of claim 1 wherein the polymerizing occurs in the presence of a nitrogen-containing ligand.

3. The method of claim 1 wherein the solvent is water, alcohol, dipolar aprotic solvent, ethylene carbonate, propylene carbonate, ionic liquid, or a mixture thereof.

4. The method of claim 2 wherein the nitrogen containing ligand comprises at least one compound of the formula:

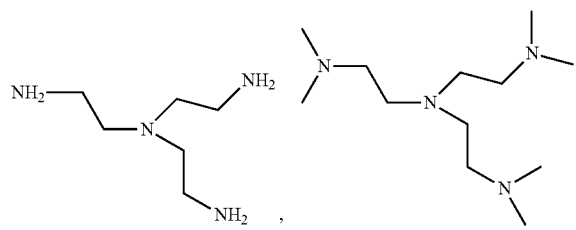

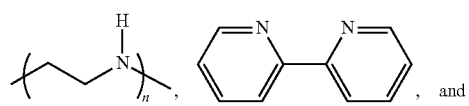

, and

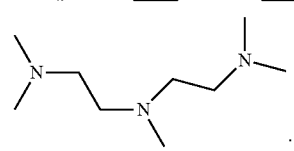

5. The method of claim 1 wherein the alkene monomer comprises one of more of acrylates, methylacrylates, halogen-substituted alkenes, acrylamides, methacrylamides, and styrene, wherein said monomers optionally contain functional groups that assist in the disproportionation of Cu(I)X into Cu(0) and Cu(II)X$_2$.

6. The method of claim 5 wherein the substituent group is amide, sulfoxide, carbonate, or onium.

7. The method of claim 1 wherein the alkene monomer is an acrylate.

8. The method of claim 1 wherein the alkene monomer is a methylacrylate.

9. The method of claim 1 wherein the alkene monomer comprises one or more halogen-substituted alkenes that are vinyl chloride, vinylidene chloride, vinyl fluoride, vinylidene fluoride, or tetrafluoroethylene, trifluorochloroethylene.

10. The method of claim 1 wherein the alkene monomer is an acrylamide.

11. The method of claim 1 wherein the alkene monomer is a methylacrylate.

12. The method of claim 1 wherein the alkene monomer is styrene.

13. The method of claim 1 wherein said contacting occurs at about 25° C. or below.

14. The method of claim 1 wherein the initiator is one or more of chloroform, bromoform, idoform, carbon tetrachloride, carbon tetrabromide and compounds of the formula:

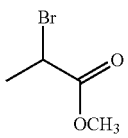 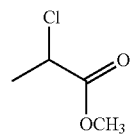

methyl 2-bromoproplonate (MBP)   methyl 2-chloroproplonate (MCP)

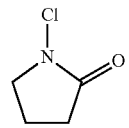

N-chloro-2-pyrrolidinone (NCP)

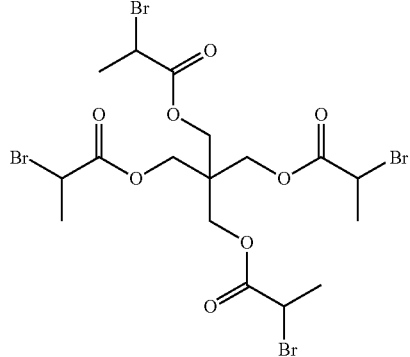

pentaerythritol tetrakis (2-bromopropionate) (4BrPr)

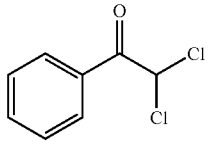 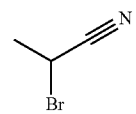

2,2-dichloroacetophenone (DCAP)   2-bromopropionitrile (BPN)

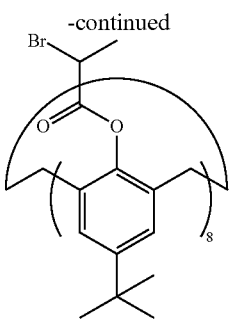

5, 11, 17, 23, 29, 35, 41, 47-octa-tert-butyl-49, 50, 51, 52, 53, 54, 55, 56-octakis-(2-bromoopropionyloxy)calyx[8]arene (8BrPr)

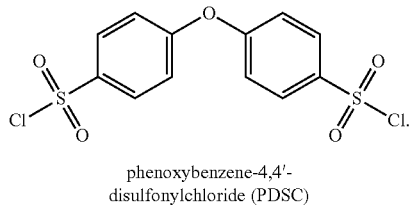

phenoxybenzene-4,4'-disulfonylchloride (PDSC)

15. The method of claim 1 wherein the solvent is a dipolar aprotic solvent.

16. The method of claim 1 wherein the solvent is DMSO or DMF.

17. The method of claim 1 wherein the solvent is DMSO.

18. The method of claim 1 where the amount of catalyst is about 100% to about 0.1%, based on moles, of the initiator.

19. The method of claim 1 further comprising isolating the polymer without the need for further purification.

20. The method of claim 1 wherein the polymer has a molecular weight of at least 500.

21. The method of claim 1 wherein the polymer has a molecular weight of at least $10^6$.

22. The method of claim 1 further comprising functionalizing at least one terminal end of the polymer.

23. The method of claim 22 wherein the polymer is functionalized by a drug moiety.

24. The method of claim 1 wherein the alkene monomer comprises a drug moiety.

25. A method of polymerizing an alkene monomer to produce a polymer having a number average molecular weight of at least $10^6$, the method comprising contacting said monomer with:

Cu(0), $Cu_2Te$, CuSe, $Cu_2S$, $Cu_2O$, or a combination thereof;

a nitrogen-containing ligand;

an initiator that is one or more of sulfonyl halides, nitrogen halides or compounds of the formula R—X, R'C(=O) OR", or R'—CN, where X is a halogen and R is $C_1$-$C_6$ alky, R' is a halogen-substituted $C_1$-$C_6$ alkyl, and R" is a $C_1$-$C_6$ alkyl; and a solvent that is water, alcohol, dipolar aprotic solvent, ethylene carbonate, propylene carbonate, or a mixture thereof;

wherein the solvent and nitrogen-containing ligand are capable of diproportionating Cu(I)X into Cu(0) and $Cu(II)X_2$ where X is Cl, Br, I where the diproportionation has an equilibrium constant of at least $10^6$ favoring the Cu(0) and $Cu(II)X_2$ species.

26. The product of the process of claim 1.

27. The product of the process of claim 21.

28. A dendrimer made by the method comprising the method of claim 1.

* * * * *

UNITED STATES PATENT AND TRADEMARK OFFICE
CERTIFICATE OF CORRECTION

PATENT NO. : 8,450,427 B2  
APPLICATION NO. : 12/376315  
DATED : May 28, 2013  
INVENTOR(S) : Virgil Percec Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1133 days.

Signed and Sealed this

Eighth Day of September, 2015

Michelle K. Lee  
*Director of the United States Patent and Trademark Office*